United States Patent
OCHI et al.

(10) Patent No.: US 8,024,613 B2
(45) Date of Patent: Sep. 20, 2011

(54) METHOD AND SYSTEM FOR MANAGING APPARATUS PERFORMANCE

(75) Inventors: Hiroyuki OCHI, Kawasaki (JP); Nobuo Beniyama, Yokohama (JP); Toshiaki Matsuo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 403 days.

(21) Appl. No.: 11/970,674

(22) Filed: Jan. 8, 2008

(65) Prior Publication Data

US 2008/0270851 A1 Oct. 30, 2008

(30) Foreign Application Priority Data

Apr. 25, 2007 (JP) .................................. 2007-115478

(51) Int. Cl.
*G06F 11/00* (2006.01)
(52) U.S. Cl. .................... 714/30; 709/223; 709/224
(58) Field of Classification Search ............ 714/47
See application file for complete search history.

(56) References Cited

U.S. PATENT DOCUMENTS

| | | | | |
|---|---|---|---|---|
| 7,058,560 B1* | 6/2006 | Arakawa et al. | ................ | 703/22 |
| 2003/0023719 A1* | 1/2003 | Castelli et al. | ................ | 709/224 |
| 2005/0050404 A1* | 3/2005 | Castelli et al. | ................ | 714/57 |
| 2005/0171626 A1* | 8/2005 | Schwarm | ................ | 700/108 |
| 2006/0010352 A1* | 1/2006 | Mukherjee et al. | ................ | 714/47 |
| 2007/0220139 A1* | 9/2007 | Ohta et al. | ................ | 709/224 |
| 2007/0233724 A1* | 10/2007 | Kyoya | ................ | 707/102 |
| 2008/0104453 A1* | 5/2008 | Mukherjee et al. | ................ | 714/47 |
| 2008/0126881 A1* | 5/2008 | Bruckhaus | ................ | 714/47 |
| 2008/0256398 A1* | 10/2008 | Gross et al. | ................ | 714/47 |
| 2009/0106605 A1* | 4/2009 | Kuchibhotla et al. | ................ | 714/47 |
| 2009/0132864 A1* | 5/2009 | Garbow | ................ | 714/47 |
| 2009/0292954 A1* | 11/2009 | Jiang et al. | ................ | 714/47 |
| 2009/0307534 A1* | 12/2009 | Sakuramoto et al. | ................ | 714/47 |

FOREIGN PATENT DOCUMENTS

JP 2001-195285 A 7/2001

* cited by examiner

*Primary Examiner* — Scott T Baderman
*Assistant Examiner* — Kamini Patel
(74) *Attorney, Agent, or Firm* — Sughrue Mion, PLLC

(57) ABSTRACT

The method comprises and executes constitutional information collection processing of collecting constitutional information of the apparatus, constitutional information of a logical unit which is a logical existence obtained by abstracting the apparatus, constitutional information of the application and constitutional information of the dependency relation of the performance established among the apparatus, the logical unit and the application; performance information collection processing of collecting each performance information of the apparatus, the logical unit and the application; and saturation indication detection processing of analyzing a correlation between a change value with time of the performance information of the apparatus and a change value with time of the performance information of the logical unit having the dependency relation of the performance with respect to the apparatus for a predetermined period, and detecting that the apparatus has the saturation indication, when a correlation coefficient obtained by the correlation analysis is a predetermined threshold value or more.

20 Claims, 35 Drawing Sheets

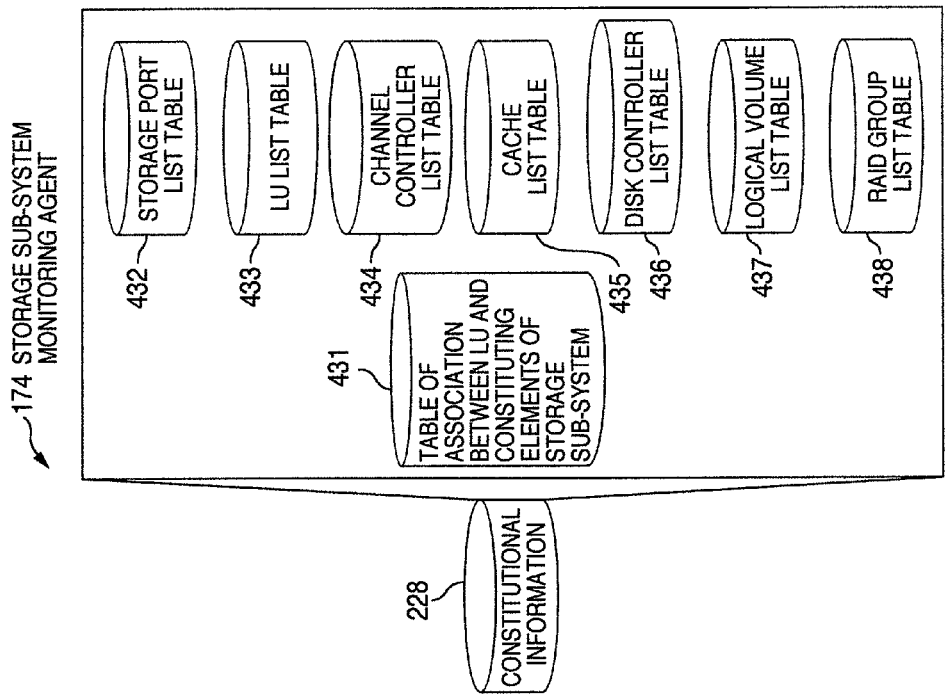
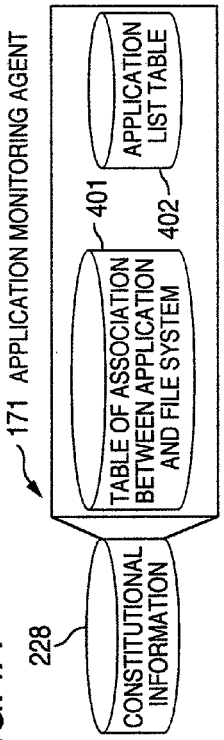
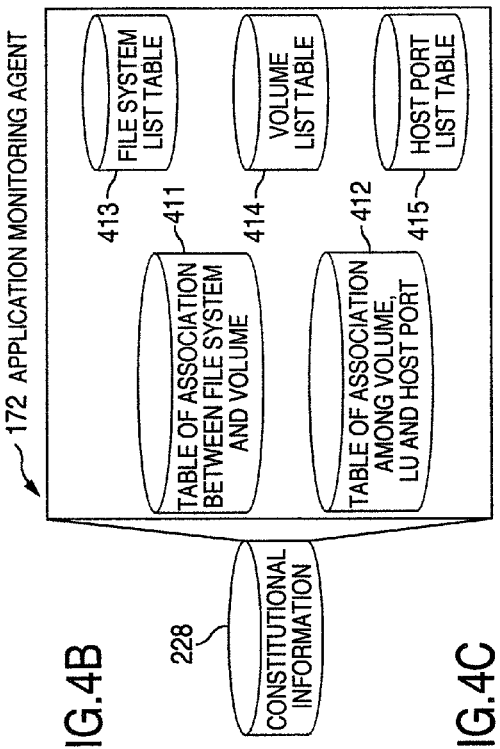
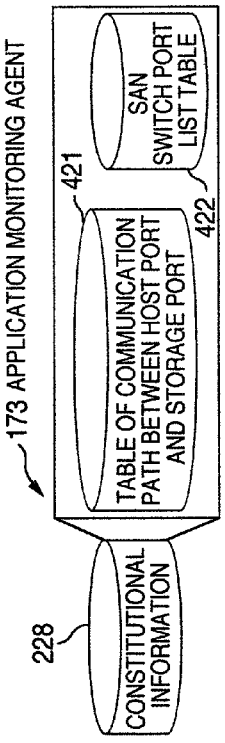

FIG.5

TABLE OF ASSOCIATION BETWEEN APPLICATION AND FILE SYSTEM 401

| APPLICATION (501) | FILE SYSTEM (502) |
|---|---|
| A | A |
| A | B |

FIG.6

TABLE OF ASSOCIATION BETWEEN FILE SYSTEM AND VOLUME 411

| FILE SYSTEM (601) | VOLUME (602) |
|---|---|
| A | A |
| B | B |
| C | C |

FIG.7

TABLE OF ASSOCIATION AMONG VOLUME, LU AND HOST PORT 412

| 701 | 702 | 703 | 704 |
|---|---|---|---|
| VOLUME | LU | LU HOLDING STORAGE SUB-SYSTEM | HOST PORT |
| A | LU-A | A | PORT A |
| B | LU-B | A | PORT A |
| C | LU-C | A | PORT A |

FIG.8

TABLE OF COMMUNICATION PATH BETWEEN HOST PORT AND STORAGE PORT 421

| 801 | 802 | 803 |
|---|---|---|
| HOST PORT | STORAGE PORT | COMMUNICATION PATH |
| PORT A | PORT J | [ PORT C , PORT D ] |
| PORT A | PORT K | [ PORT C , PORT E , PORT F , PORT H ] |
| PORT B | PORT L | [ PORT G , PORT I ] |

FIG.9

TABLE OF ASSOCIATION BETWEEN LU AND CONSTITUTING ELEMENTS OF STORAGE SUB-SYSTEM 431

| LU | STORAGE PORT | CHANNEL CONTROLLER | CACHE | DISK CONTROLLER | LOGICAL VOLUME | RAID GROUP |
|---|---|---|---|---|---|---|
| LU-A | PORT J | A | A | A | A | A |
| LU-B | PORT J | A | A | A | B | A |
| LU-C | PORT K | B | A | B | C | B |
| LU-D | PORT L | B | A | B | D | B |

FIG.11

APPARATUS LIST TABLE 1001

| APPARATUS TYPE | APPARATUS NAME | BELONGING LOCATION | SATURATION INDICATION DETECTING TARGET |
|---|---|---|---|
| CPU | CPU-A | HOST SERVER A | Yes |
| ⋮ | ⋮ | ⋮ | ⋮ |
| MEMORY | MEMORY-A | HOST SERVER A | Yes |
| ⋮ | ⋮ | ⋮ | ⋮ |
| HOST PORT | PORT A | HOST SERVER A | Yes |
| ⋮ | ⋮ | ⋮ | ⋮ |
| SAN SWITCH PORT | PORT C | SAN SWITCH A | Yes |
| ⋮ | ⋮ | ⋮ | ⋮ |
| STORAGE PORT | PORT J | STORAGE SUB-SYSTEM A | Yes |
| ⋮ | ⋮ | ⋮ | ⋮ |
| CHANNEL CONTROLLER | A | STORAGE SUB-SYSTEM A | Yes |
| ⋮ | ⋮ | ⋮ | ⋮ |
| CACHE | A | STORAGE SUB-SYSTEM A | Yes |
| ⋮ | ⋮ | ⋮ | ⋮ |
| DISK CONTROLLER | A | STORAGE SUB-SYSTEM A | Yes |
| ⋮ | ⋮ | ⋮ | ⋮ |
| RAID GROUP | A | STORAGE SUB-SYSTEM A | Yes |
| ⋮ | ⋮ | ⋮ | ⋮ |

APPLICATION LIST TABLE 1002

| APPLICATION NAME (1201) | BELONGING LOCATION (1202) | SATURATION INDICATION DETECTING TARGET (1203) |
|---|---|---|
| A | HOST SERVER A | Yes |
| B | HOST SERVER A | Yes |
| C | HOST SERVER B | Yes |

FIG.13

TABLE OF ASSOCIATION BETWEEN APPARATUS AND APPLICATION 1003

| APPARATUS TYPE (1300) | APPARATUS NAME (1301) | BELONGING LOCATION (1302) | APPLICATION NAME (1303) | BELONGING LOCATION (1304) |
|---|---|---|---|---|
| CPU | CPU-A | HOST SERVER A | A | HOST SERVER A |
| CPU | CPU-A | HOST SERVER A | B | HOST SERVER A |
| : | : | : | : | : |
| MEMORY | MEMORY A | HOST SERVER A | A | HOST SERVER A |
| MEMORY | MEMORY A | HOST SERVER A | B | HOST SERVER A |
| : | : | : | : | : |
| PORT | PORT A | STORAGE SUB-SYSTEM A | A | HOST SERVER A |
| PORT | PORT B | STORAGE SUB-SYSTEM A | B | HOST SERVER A |
| : | : | : | : | : |
| PORT | PORT C | STORAGE SUB-SYSTEM A | A | HOST SERVER A |
| PORT | PORT C | STORAGE SUB-SYSTEM A | B | HOST SERVER A |
| : | : | : | : | : |

FIG.15

PERFORMANCE INFORMATION STORAGE TABLE 1402

| MONITORING TARGET TYPE | MONITORING TARGET NAME | BELONGING LOCATION | PERFORMANCE TYPE | PERFORMANCE VALUE | OBSERVATION TIME |
|---|---|---|---|---|---|
| APPLICATION | A | HOST SERVER A | RESPONSE TIME | 20ms | 10:00:00 JANUARY 22, 2007 |
| APPLICATION | A | HOST SERVER A | RESPONSE TIME | 30ms | 10:00:01 JANUARY 22, 2007 |
| APPLICATION | A | HOST SERVER A | RESPONSE TIME | 32ms | 10:00:02 JANUARY 22, 2007 |
| .. | .. | .. | .. | .. | .. |
| CPU | CPU-A | HOST SERVER A | DUTY FACTOR | 79% | 10:00:00 JANUARY 22, 2007 |
| CPU | CPU-A | HOST SERVER A | DUTY FACTOR | 49% | 10:00:01 JANUARY 22, 2007 |
| CPU | CPU-A | HOST SERVER A | DUTY FACTOR | 86% | 10:00:02 JANUARY 22, 2007 |
| .. | .. | .. | .. | .. | .. |
| CHANNEL CONTROLLER | A | STORAGE SUB-SYSTEM A | DUTY FACTOR | 80% | 10:00:00 JANUARY 22, 2007 |
| CHANNEL CONTROLLER | A | STORAGE SUB-SYSTEM A | DUTY FACTOR | 68% | 10:00:01 JANUARY 22, 2007 |
| CHANNEL CONTROLLER | A | STORAGE SUB-SYSTEM A | DUTY FACTOR | 58% | 10:00:02 JANUARY 22, 2007 |
| .. | .. | .. | .. | .. | .. |

SATURATION INDICATION DETECTING TARGET APPARATUS SETTING SCREEN

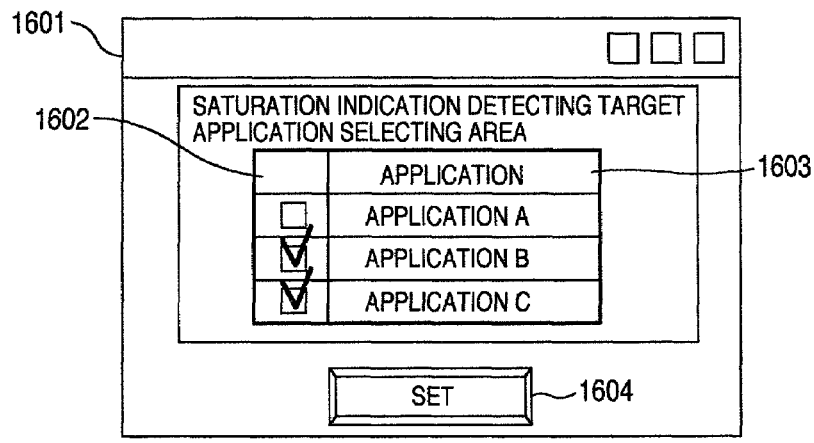

FIG.16B

APPLICATION LIST TABLE 1002

| APPLICATION NAME | BELONGING LOCATION | SATURATION INDICATION DETECTING TARGET |
|---|---|---|
| A | HOST SERVER A | No |
| B | HOST SERVER A | Yes |
| C | HOST SERVER A | Yes |

FIG.16C

APPARATUS LIST TABLE 1001

| APPARATUS TYPE | APPARATUS NAME | BELONGING LOCATION | SATURATION INDICATION DETECTING TARGET |
|---|---|---|---|
| : | : | : | : |
| CHANNEL CONTROLLER | A | STORAGE SUB-SYSTEM A | No |
| CHANNEL CONTROLLER | B | STORAGE SUB-SYSTEM A | Yes |
| DISK CONTROLLER | A | STORAGE SUB-SYSTEM A | No |
| DISK CONTROLLER | B | STORAGE SUB-SYSTEM A | Yes |
| RAID GROUP | A | STORAGE SUB-SYSTEM A | No |
| RAID GROUP | B | STORAGE SUB-SYSTEM A | Yes |

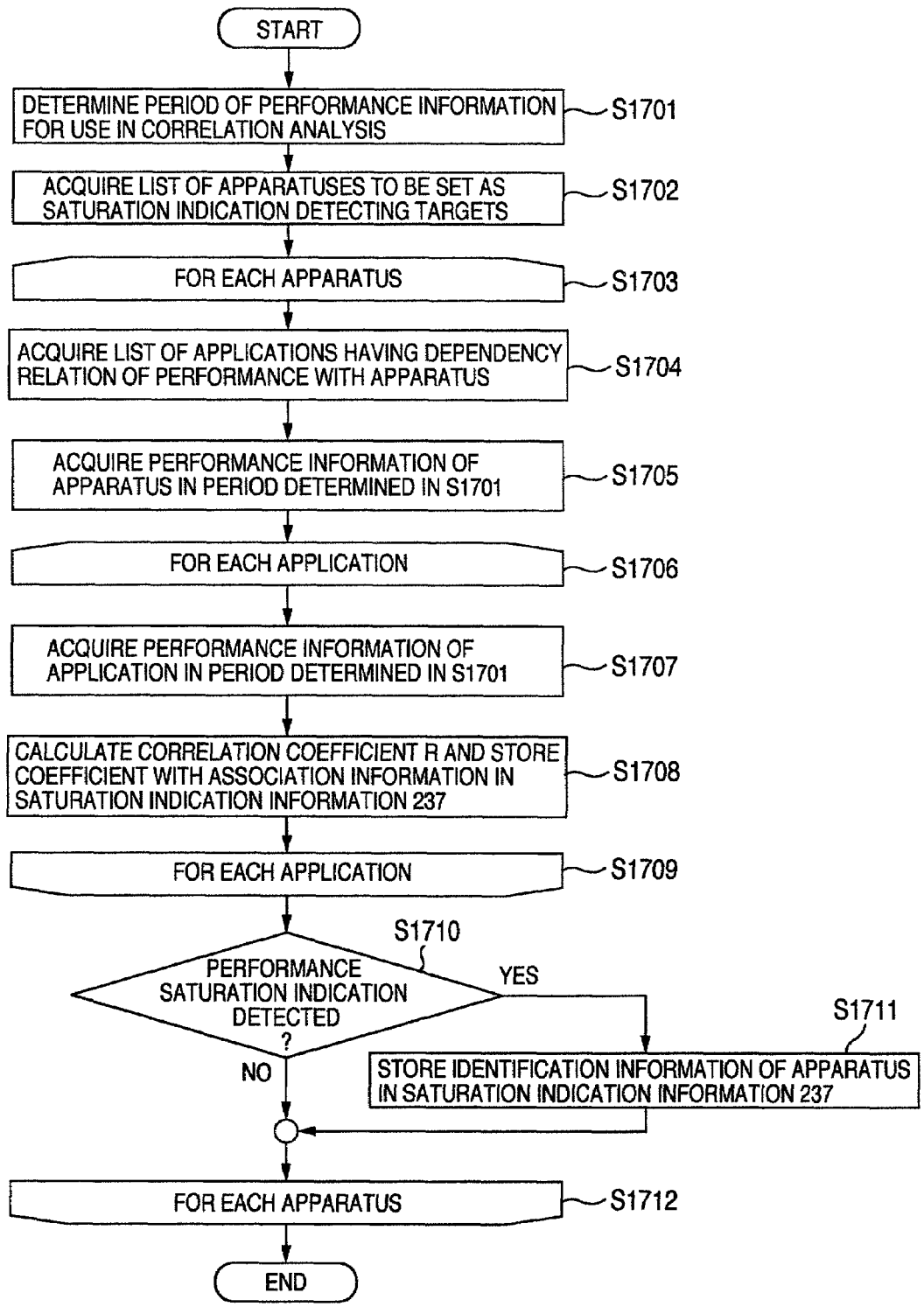

FIG.21

CORRELATION COEFFICIENT CALCULATION RESULT TABLE 2001

| APPARATUS TYPE | APPARATUS NAME | BELONGING LOCATION | APPLICATION NAME | BELONGING LOCATION | START TIME | END TIME | CORRELATION COEFFICIENT |
|---|---|---|---|---|---|---|---|
| CPU | CPU-A | HOST SERVER A | A | HOST SERVER A | 10:00:00 JANUARY 22, 2007 | 12:00:00 JANUARY 22, 2007 | 0.53 |
| CPU | CPU-A | HOST SERVER A | B | | 10:00:00 JANUARY 22, 2007 | 12:00:00 JANUARY 22, 2007 | 0.74 |
| .. | .. | .. | .. | .. | .. | .. | .. |
| CHANNEL CONTROLLER | A | STORAGE SUB-SYSTEM A | A | HOST SERVER A | 10:00:00 JANUARY 22, 2007 | 12:00:00 JANUARY 22, 2007 | 0.46 |
| DISK CONTROLLER | A | STORAGE SUB-SYSTEM A | A | HOST SERVER A | 10:00:00 JANUARY 22, 2007 | 12:00:00 JANUARY 22, 2007 | 0.20 |
| .. | .. | .. | .. | .. | .. | .. | .. |

FIG.22

SATURATION INDICATION INFORMATION TABLE 2002

| APPARATUS TYPE | APPARATUS NAME | BELONGING LOCATION | START TIME | END TIME |
|---|---|---|---|---|
| CPU | CPU-A | HOST SERVER A | 10:00:00 JANUARY 22, 2007 | 12:00:00 JANUARY 22, 2007 |
| ⋮ | ⋮ | ⋮ | ⋮ | ⋮ |
| CHANNEL CONTROLLER | A | STORAGE SUB-SYSTEM A | 10:00:00 JANUARY 22, 2007 | 12:00:00 JANUARY 22, 2007 |
| ⋮ | ⋮ | ⋮ | ⋮ | ⋮ |

| 2302 | 2303 | 2304 | 2305 | 2306 | 2307 | 2308 |
|---|---|---|---|---|---|---|
| APPARATUS TYPE | APPARATUS NAME | BELONGING LOCATION | DUTY FACTOR | NAME OF APPLICATION USING APPARATUS | APPLICATION OPERATING SERVER | RESPONSE TIME |
| CPU | CPU-A | HOST SERVER A | 89% | A | HOST SERVER A | 400ms |
| | | | | B | HOST SERVER A | 300ms |
| CHANNEL CONTROLLER | A | STORAGE SUB-SYSTEM A | 81% | A | HOST SERVER A | 450ms |

2301

2311 □ □     2312

| | CORRELATION COEFFICIENT CALCULATION PERIOD | | REPORT |
|---|---|---|---|
| CORRELATION COEFFICIENT | START TIME | END TIME | |
| 0.53 | 10:00:00 JANUARY 22, 2007 | 12:00:00 JANUARY 22, 2007 | DISPLAY |
| 0.74 | 10:00:00 JANUARY 22, 2007 | 12:00:00 JANUARY 22, 2007 | DISPLAY |
| 0.46 | 10:00:00 JANUARY 22, 2007 | 12:00:00 JANUARY 22, 2007 | DISPLAY |

2309   2310      2313

SATURATION INDICATION INFORMATION OUTPUT PROCESSING S238

LOGICAL UNIT LIST TABLE 2601

| LOGICAL UNIT TYPE | LOGICAL UNIT NAME | BELONGING POSITION |
|---|---|---|
| FILE SYSTEM | A | HOST SERVER A |
| FILE SYSTEM | B | HOST SERVER A |
| ⋮ | ⋮ | ⋮ |
| VOLUME | A | HOST SERVER A |
| VOLUME | B | HOST SERVER A |
| ⋮ | ⋮ | ⋮ |
| LU | LU-A | STORAGE SUB-SYSTEM A |
| LU | LU-B | STORAGE SUB-SYSTEM A |
| ⋮ | ⋮ | ⋮ |
| LOGICAL VOLUME | A | STORAGE SUB-SYSTEM A |
| LOGICAL VOLUME | B | STORAGE SUB-SYSTEM A |
| ⋮ | ⋮ | ⋮ |

FIG.28

TABLE OF ASSOCIATION BETWEEN APPARATUS AND LOGICAL UNIT 2602

| APPARATUS TYPE | APPARATUS NAME | BELONGING LOCATION | LOGICAL UNIT TYPE | LOGICAL UNIT TYPE | BELONGING LOCATION |
|---|---|---|---|---|---|
| 2800 | 2801 | 2802 | 2803 | 2804 | 2805 |
| PORT | PORT A | HOST SERVER A | VOLUME | A | HOST SERVER A |
| PORT | PORT A | HOST SERVER A | VOLUME | B | HOST SERVER A |
| .. | .. | .. | .. | .. | .. |
| CHANNEL CONTROLLER | A | STORAGE SUB-SYSTEM A | LU | LU-A | STORAGE SUB-SYSTEM A |
| CHANNEL CONTROLLER | A | STORAGE SUB-SYSTEM A | LU | LU-B | STORAGE SUB-SYSTEM A |
| .. | .. | .. | .. | .. | .. |
| DISK CONTROLLER | A | STORAGE SUB-SYSTEM A | LU | LU-A | STORAGE SUB-SYSTEM A |
| DISK CONTROLLER | A | STORAGE SUB-SYSTEM A | LU | LU-B | STORAGE SUB-SYSTEM A |
| .. | .. | .. | .. | .. | .. |
| RAID GROUP | A | STORAGE SUB-SYSTEM A | LU | LU-A | STORAGE SUB-SYSTEM A |
| RAID GROUP | A | STORAGE SUB-SYSTEM A | LU | LU-B | STORAGE SUB-SYSTEM A |
| .. | .. | .. | .. | .. | .. |

FIG.29

TABLE OF ASSOCIATION BETWEEN LOGICAL UNIT AND APPLICATION 2603

| LOGICAL UNIT TYPE 2900 | LOGICAL UNIT NAME 2901 | BELONGING LOCATION 2902 | APPLICATION NAME 2903 | BELONGING LOCATION 2904 |
|---|---|---|---|---|
| VOLUME | A | HOST SERVER A | A | HOST SERVER A |
| VOLUME | A | HOST SERVER A | A | HOST SERVER A |
| .. | .. | .. | .. | .. |
| LU | LU-A | STORAGE SUB-SYSTEM A | A | HOST SERVER A |
| LU | LU-B | STORAGE SUB-SYSTEM A | B | HOST SERVER A |
| .. | .. | .. | .. | .. |

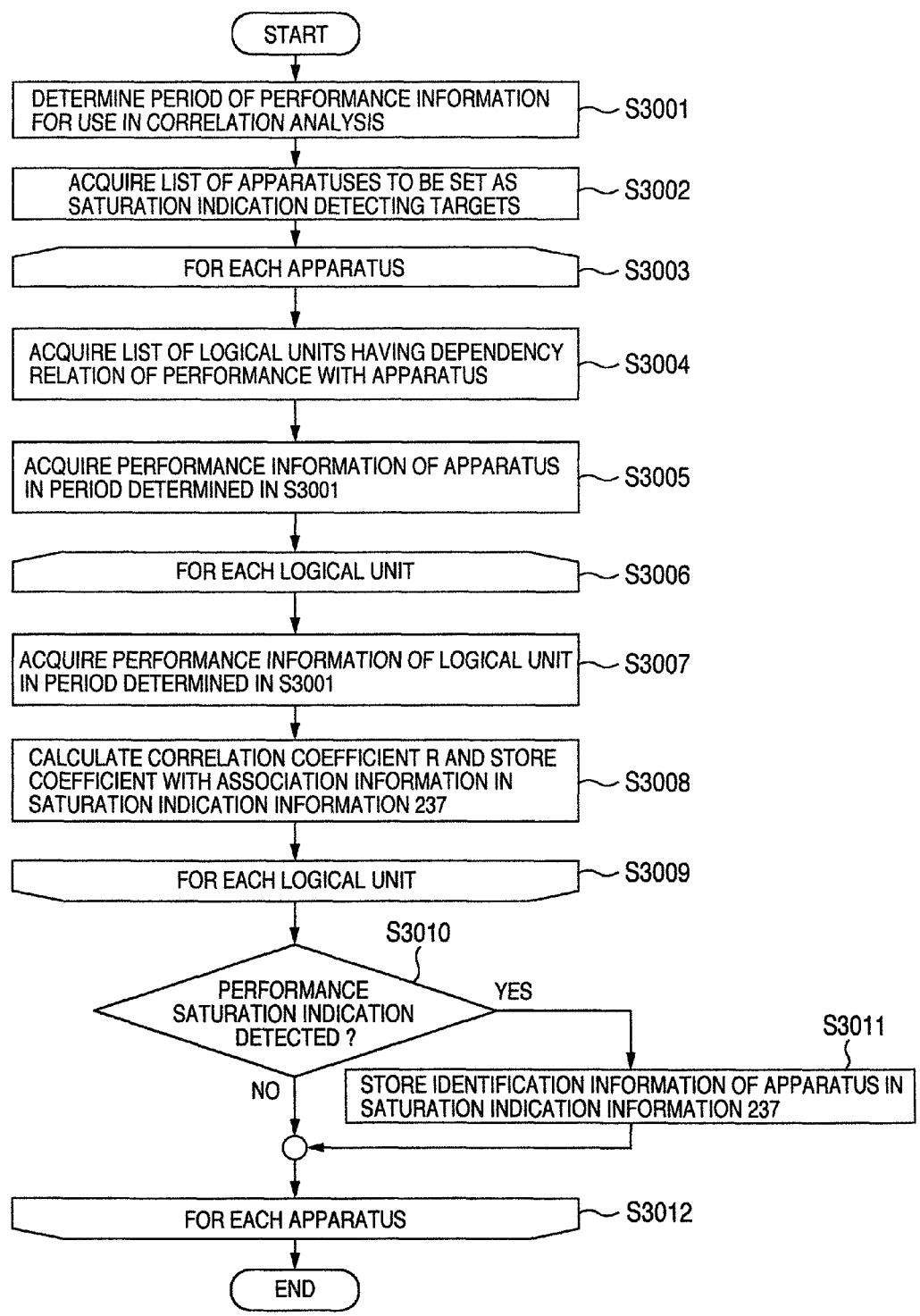

FIG.31

CORRELATION COEFFICIENT CALCULATION RESULT TABLE 2001A

| APPARATUS TYPE | APPARATUS NAME | BELONGING LOCATION | LOGICAL UNIT TYPE | LOGICAL UNIT NAME | BELONGING LOCATION | START TIME | END TIME | CORRELATION COEFFICIENT |
|---|---|---|---|---|---|---|---|---|
| .. | .. | .. | .. | .. | .. | .. | .. | .. |
| CHANNEL CONTROLLER | A | STORAGE SUB-SYSTEM A | LU | LU-A | STORAGE SUB-SYSTEM A | 10:00:00 JANUARY 22, 2007 | 12:00:00 JANUARY 22, 2007 | 0.56 |
| CHANNEL CONTROLLER | A | STORAGE SUB-SYSTEM A | LU | LU-B | STORAGE SUB-SYSTEM A | 10:00:00 JANUARY 22, 2007 | 12:00:00 JANUARY 22, 2007 | 0.21 |
| DISK CONTROLLER | A | STORAGE SUB-SYSTEM A | LU | LU-A | STORAGE SUB-SYSTEM A | 10:00:00 JANUARY 22, 2007 | 12:00:00 JANUARY 22, 2007 | 0.63 |
| DISK CONTROLLER | A | STORAGE SUB-SYSTEM A | LU | LU-B | STORAGE SUB-SYSTEM A | 10:00:00 JANUARY 22, 2007 | 12:00:00 JANUARY 22, 2007 | 0.74 |
| .. | .. | .. | .. | .. | .. | .. | .. | .. |

| 3202 | 3203 | 3204 | 3205 | 3206 | 3207 | 3208 | 3209 |
|---|---|---|---|---|---|---|---|
| APPARATUS TYPE | APPARATUS NAME | APPARATUS BELONGING LOCATION | DUTY FACTOR | LOGICAL UNIT TYPE | LOGICAL UNIT NAME | LOGICAL UNIT BELONGING LOCATION | RESPONSE TIME |
| HOST PORT | PORT A | HOST SERVER A | 89% | LU | LU-A | STORAGE SUB-SYSTEM A | 400ms |
| | | | | LU | LU-B | STORAGE SUB-SYSTEM A | 300ms |
| CHANNEL CONTROLLER | A | STORAGE SUB-SYSTEM A | 90% | LU | LU-A | STORAGE SUB-SYSTEM A | 450ms |
| | | | | LU | LU-B | STORAGE SUB-SYSTEM A | 500ms |

3201

| CORRELATION COEFFICIENT | CORRELATION COEFFICIENT CALCULATION PERIOD | | ASSOCIATED APPLICATION NAME | APPLICATION OPERATING SERVER | REPORT |
|---|---|---|---|---|---|
| | START TIME | END TIME | | | |
| 0.56 | 10:00:00 JANUARY 22, 2007 | 12:00:00 JANUARY 22, 2007 | A | HOST SERVER A | DISPLAY |
| 0.21 | 10:00:00 JANUARY 22, 2007 | 12:00:00 JANUARY 22, 2007 | A | HOST SERVER A | DISPLAY |
| 0.63 | 10:00:00 JANUARY 22, 2007 | 12:00:00 JANUARY 22, 2007 | A | HOST SERVER A | DISPLAY |
| 0.74 | 10:00:00 JANUARY 22, 2007 | 12:00:00 JANUARY 22, 2007 | A | HOST SERVER A | DISPLAY |

SATURATION INDICATION INFORMATION OUTPUT PROCESSING S238A

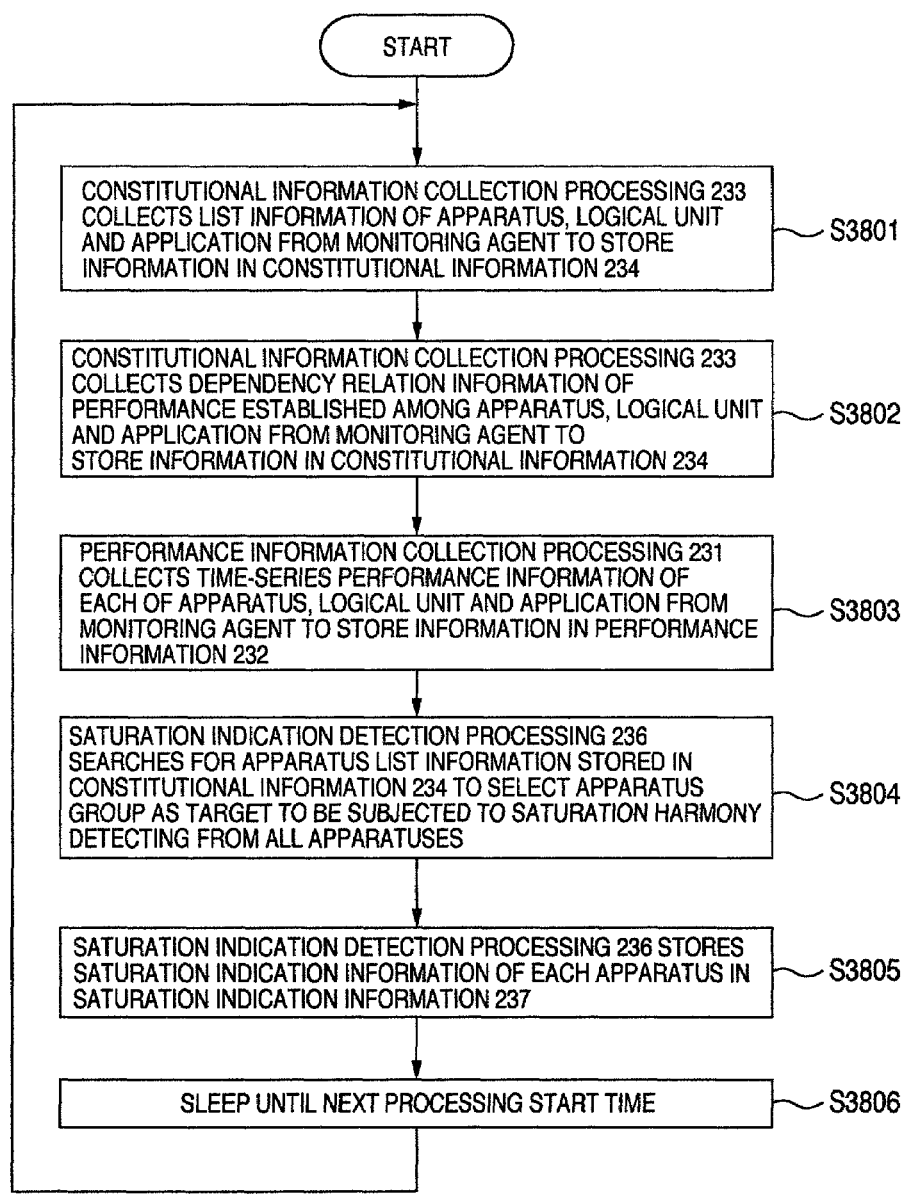

METHOD AND SYSTEM FOR MANAGING APPARATUS PERFORMANCE

INCORPORATION BY REFERENCE

The present application claims priority from Japanese application JP 2007-115478 filed on Apr. 25, 2007, the content of which is hereby incorporated by reference into this application.

BACKGROUND OF THE INVENTION

1. Field of the Invention

The present invention relates to an apparatus having a high possibility that a performance problem will be caused in an application in future, a method for managing apparatus performance in which it is possible to detect the apparatus having the high possibility that the performance problem is caused in the application at present, a system for managing the apparatus performance, and a management program.

To detect the apparatus having the high possibility that the performance problem will be caused in the application in future or the apparatus having the high possibility that the performance problem is caused in the application at present will hereinafter be referred to as the detection of the performance saturation indication.

2. Description of Related Art

Heretofore, as a method for managing performance of a computer system, the following two types of methods have been performed. Performance Management Method 1 is a reactive method in which, in a case where the performance problem is generated in a certain application, the performance of an apparatus group concerning execution of the application is checked, and a performance bottleneck is analyzed to specify the apparatus that has caused the performance problem in the application.

Performance Management Method 2 is a proactive method in which performance saturation indication of the application is detected to detect that there is a possibility of occurrence of the performance problem before the performance problem of the application occurs.

Either of Performance Management Methods 1 and 2 imposes a large burden on an apparatus manager, if the management is not supported by a computer program or the like in a case where an excessively large number of apparatuses exist as performance management targets. To solve the problem, support methods have been performed.

In Support Method A of Performance Management Method 1, performance information of the application in which the performance problem has occurred, and a correlation between the performance information and performance information of each of apparatuses of an apparatus group having a dependency relation of the performance with respect to the application are checked to presume an apparatus which is probably a bottle neck in the apparatus group.

In Support Method B of Performance Management Method 2, threshold value information is set with respect to the performance information of the application or the apparatus in advance, the periodically observed performance information is compared with the threshold value information, and an alert (warning or notice) is raised based on a rule to support the management (e.g., JP-A-2001-195285).

SUMMARY OF THE INVENTION

The Support Method A is a support method for presuming an apparatus which is probably a cause for a performance problem in an apparatus group having a dependency relation of performance with respect to an application, in a case where the application in which the performance problem has been generated is known. The method cannot be used in a case where it is not found that the performance problem is generated in the application.

Moreover, in a support method in which a threshold value obtained by Support Method B is used, it is originally difficult to determine an appropriate threshold value. Specifically, performance information of the apparatus includes a duty factor, a throughput, a response time and the like of the apparatus. It is difficult for a manager of the apparatus to known in detail a degree of such a value at which the apparatus gives a saturation indication.

Performance Management Method 2 has a purpose of investigating a performance reinforcing plan of a computer system and optimizing a resource arrangement before the performance problem is generated in the application. However, there is a problem that the performance saturation indication of the application cannot sufficiently proactively be detected before the performance problem of the application occurs.

The present invention has been developed to solve the above problem, and an object is to provide a method for managing apparatus performance, a system for managing the apparatus performance and a management program which are capable of detecting an apparatus having a high possibility that a performance problem will be caused in an application in future or an apparatus having a high possibility that the performance problem is caused in the application at present.

A method for managing apparatus performance according to the present invention is characterized in that a management server (e.g., a performance management server 151) which manages the apparatus performance in a system including one or more apparatuses and one or more applications having a dependency relation of performance with respect to the apparatus comprises and executes: constitutional information collection processing (e.g., constitutional information collection processing S233) of collecting constitutional information of the apparatus, constitutional information of the application and constitutional information of the dependency relation of the performance established between the apparatus and the application; performance information collection processing (e.g., performance information collection processing S231) of collecting performance information of the apparatus and performance information of the application; and saturation indication detection processing (e.g., saturation indication detection processing S236) of detecting a saturation indication of the apparatus based on the constitutional information and the performance information.

A method for managing apparatus performance according to the present invention is characterized in that a management server which manages the apparatus performance in a system including one or more apparatuses and one or more applications having a dependency relation of performance with respect to the apparatus comprises and executes: constitutional information collection processing of collecting constitutional information of the apparatus, constitutional information of a logical unit which is a logical existence obtained by abstracting the apparatus, constitutional information of the application and constitutional information of the dependency relation of the performance established among the apparatus, the logical unit and the application; performance information collection processing of collecting performance information of the apparatus, performance information of the logical unit and performance information of the application; and saturation indication detection processing of detecting a saturation indication of the apparatus based on the constitutional information and the performance information.

It is preferable that the saturation indication detection processing analyzes a correlation between a change value with time of the performance information of the apparatus and a change value with time of the performance information of the application for a predetermined period, and detects that the apparatus has the saturation indication, when a correlation coefficient obtained by the correlation analysis is a predetermined threshold value or more.

Moreover, it is preferable that the saturation indication detection processing analyzes a correlation between a change value with time of the performance information of the apparatus and a change value with time of the performance information of the logical unit having the dependency relation of the performance with respect to the apparatus for a predetermined period, and detects that the apparatus has the saturation indication, when a correlation coefficient obtained by the correlation analysis is a predetermined threshold value or more.

According to the present invention, it is possible to detect the apparatus having a high possibility that the performance problem will be caused in the application in future or the apparatus having a high possibility that the performance problem is caused in the application at present.

Other objects, features and advantages of the invention will become apparent from the following descriptions of the embodiments of the invention taken in conjunction with the accompanying drawings.

BRIEF DESCRIPTION OF THE DRAWINGS

FIGS. 4A to 4D are explanatory views showing tables included in the constitutional information of each monitoring agent;

FIG. 5 is an explanatory view showing a structure of a table of association between the application and a file system;

FIG. 6 is an explanatory view showing a structure of a table of association between the file system and a volume;

FIG. 7 is an explanatory view showing a structure of a table of association among the volume, an LU and a host port;

FIG. 8 is an explanatory view showing a structure of a table of a communication path between the host port and a storage port;

FIG. 9 is an explanatory view showing a structure of a table of association between the LU and elements of a storage sub-system;

FIG. 11 is an explanatory view showing a structure of an apparatus list table;

FIG. 12 is an explanatory view showing a structure of an application list table;

FIG. 13 is an explanatory view showing a structure of a table of association between the apparatus and the application;

FIG. 15 is an explanatory view showing a structure of a performance information storage table;

FIG. 16A shows a screen example to determine a saturation indication detecting target from a management target apparatus group, and FIGS. 16B, 16C are explanatory views showing contents of an association table in accordance with the determined contents;

FIG. 17 is a flow chart showing saturation indication detection processing of apparatus performance management software according to Embodiment 1;

FIG. 21 is an explanatory view showing a structure of a correlation coefficient calculation result table according to Embodiment 1;

FIG. 22 is an explanatory view showing a structure of a saturation indication information table;

FIG. 23 is an explanatory view showing a screen example output by saturation indication information output processing of the apparatus performance management software according to Embodiment 1;

FIG. 28 is an explanatory view showing a structure of a table of association between an apparatus and a logical unit;

FIG. 29 is an explanatory view showing a structure of a table of association between the logical unit and an application;

FIG. 30 is a flow chart showing saturation indication detection processing of the apparatus performance management software according to Embodiment 2;

FIG. 31 is an explanatory view showing a structure of a correlation coefficient calculation result table according to Embodiment 2;

FIG. 32 is an explanatory view showing a screen example output by saturation indication information output processing of the apparatus performance management software according to Embodiment 2;

FIG. 38 is a flow chart showing main processing of the saturation indication detection processing of the apparatus performance management software.

DESCRIPTION OF THE EMBODIMENT

Figure 1:
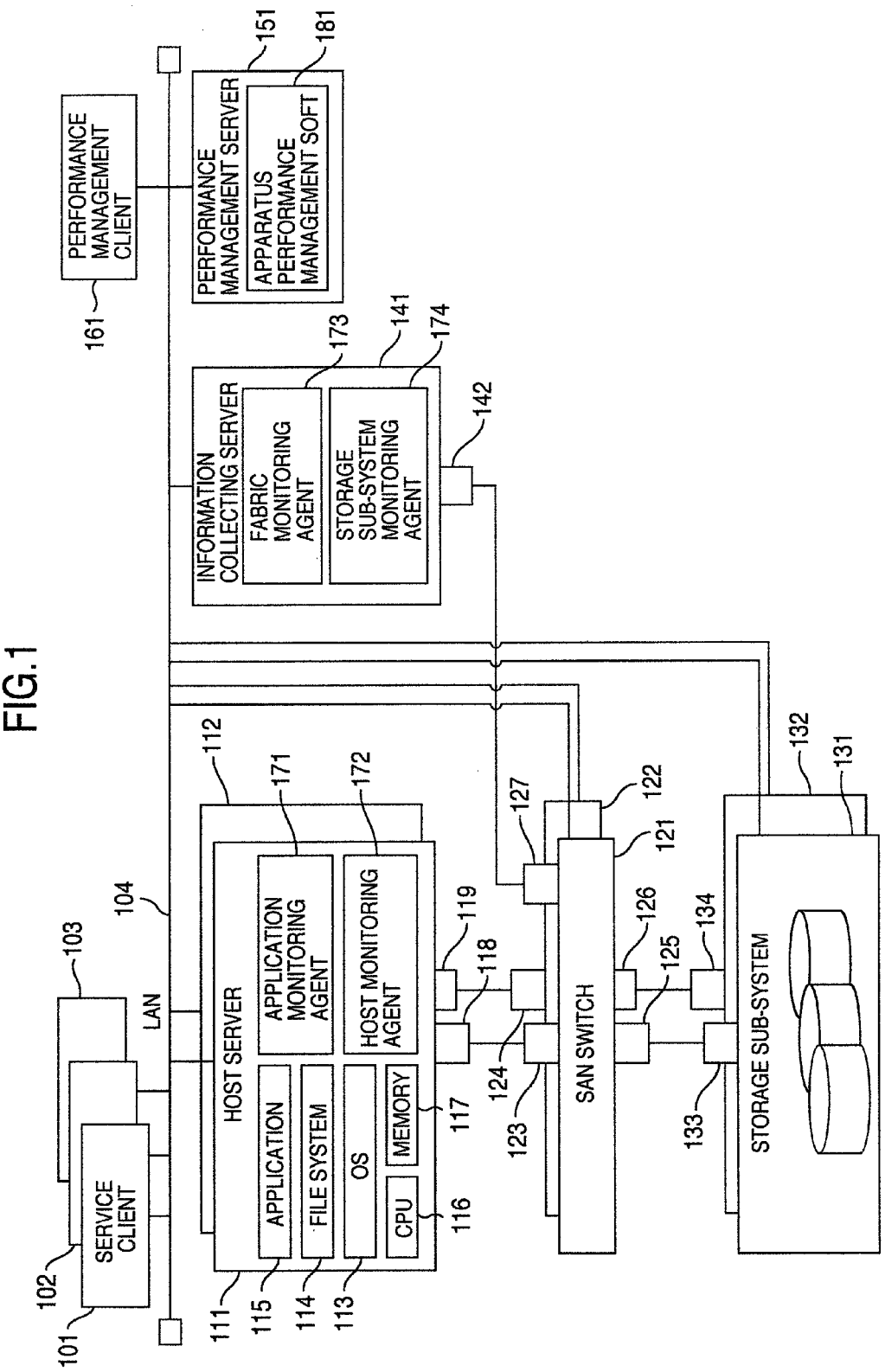
FIG. 1 is a block diagram showing the whole constitution of the present invention.

Embodiments of the present invention will hereinafter be described in detail with reference to the drawings.

First, an outline of the present invention will be described. In a method for managing apparatus performance according to the present invention, two values including a time-series measurement value of a duty factor of an apparatus as a saturation indication detecting target and a time-series measurement value of a service level received from the apparatus by one application or a plurality of applications having a dependency relation of performance with respect to the apparatus are input to calculate a correlation coefficient between change value strings of the measurement values with an elapse of time. The correlation coefficient is regarded as a degree of saturation of the apparatus. When the correlation coefficient exceeds a threshold value, it is considered that the apparatus has an indication that a performance problem will be caused in the application or that the performance problem is caused in the application.

After the duty factor of the apparatus increases and reaches a value peculiar to each apparatus, the service level of the application in which the apparatus is used rapidly deteriorates. At this time, there is a high correlation between the change value of the duty factor of the apparatus and the change value of the service level received by the application from the apparatus. In the present invention, indication of saturation of the apparatus is detected using the correlation between the change value of the duty factor and the change value of the service level. In the method for managing the apparatus performance of the present invention, the threshold value of the duty factor of the apparatus is not set, and the threshold value of the correlation coefficient is used.

More specifically, the indication of the saturation of the apparatus is detected according to the following steps S1 to S5. The detected indication of the performance saturation of the apparatus may be displayed or output with a screen, a log or the like. Several steps are supposed to have variations as described later in detail.

Step S1: The step detects a list of apparatuses, logical existences obtained by abstracting the apparatuses and applications from a system of a target to be monitored by performance management software periodically or in response to a request to store the list as a part of constitutional information.

Step S2: The step detects a dependency relation of performance established among the apparatus, the logical existence obtained by abstracting the apparatus and the application periodically or in response to a request to store the dependency relation as a remaining part of the constitutional information. The dependency relation of the performance is a relation among a series of apparatuses and software which process an I/O command to be issued by the application, if any.

Step S3: The step collects performance information from the apparatus, the logical existence of the abstracted apparatus and the application periodically or in response to a request to store the performance information.

Step S4: The step determines an apparatus group from which the indication of saturation is to be detected from the apparatus list detected in the step S1.

Step S5: The step limits an application group having the dependency relation of the performance between the application and the group by use of the constitutional information detected and stored in the step S2 with respect to each apparatus group determined as the target of the saturation indication detection, and calculates the correlation coefficient of the change of the performance information with elapse of time between the apparatus and the application group by use of the performance information stored in the step S3. When the apparatus has the correlation coefficient in excess of the threshold value, it is judged that the apparatus has given the saturation indication. As a substitute for the performance information of the application, the performance information of the logical existence obtained by abstracting the apparatus and having the dependency relation of the performance with respect to the apparatus may be used. In this case, the logical existence can be regarded as an interface in a case where the apparatus uses the application and a user of the apparatus.

Embodiment 1

FIG. 1 is a block diagram showing the whole constitution of the present invention. Hardware constituting a service system based on a host, a storage device and a storage area network disposed between the host and the storage device includes service clients 101 to 103, a local area network (LAN) 104, host servers 111, 112, SAN switches 121, 122 of the storage area network (SAN) and storage sub-systems 131, 132, and software similarly includes an application 115, an operating system (OS) 113 and a file system 114.

The service clients 101 to 103 are apparatuses such as a personal computer, a work station and a thin client terminal which provide a user interface function of the service system, and communicate with the application 115 and the like operated in the host servers 111, 112 via the LAN 104.

The application 115 is software which provides a service logical function of the service system, and responds to processing requests from the service clients 101 to 103 to request the file system 114 to refer to and update data as needed.

The file system 114 is software which provides a management processing of the data, and responds to a request from the application 115 to perform processing concerning operation and management of the data stored in the storage sub-systems 131, 132 via the OS 113. To execute the application 115, the file system 114 and the OS 113, a central processing unit (CPU) 116 and a memory 117 of the host server are required.

The file system 114 accesses the data stored in the storage sub-systems 131, 132 via the OS 113, host bus adapters 118, 119, host-side ports 123, 124 of the SAN switches, the SAN switches 121, 122, storage-side ports 125, 126 of the SAN switches and ports 133, 134 of the storage sub-systems.

Hardware constituting a system for managing performances of the host server, the storage area network, the storage sub-system and the application include an information collecting server 141, a performance management server 151 and a performance management client 161, and software similarly includes an application monitoring agent 171, a host monitoring agent 172, a fabric monitoring agent 173, a storage sub-system monitoring agent 174 and apparatus performance management soft 181. It is to be noted that the apparatus performance management soft is apparatus performance management software.

The performance management client 161 is a device which provides a user interface function of the apparatus performance management software 181, and communicates with the apparatus performance management software 181 of the performance management server 151 via the LAN 104.

The apparatus performance management software 181 is software which provides processing concerning collection and analysis of the performance information of the apparatus, and acquires the performance information from various hardware and software constituting the network.

A method will hereinafter be described in which the apparatus performance management software 181 uses each monitoring agent software for exclusive use in order to acquire the performance information of the hardware and the software. There are various methods for constitution and arrangement of the agent, but a method for carrying out the present invention is not limited to the present embodiment. There could be a configuration in which the apparatus performance management software 181 directly communicates with the apparatus or the software as a monitoring target without interposing any agent, and the present invention is applicable to such a configuration.

The apparatus performance management software 181 is realized by executing the software by a CPU of the performance management server 151, and the software of each monitoring agent is realized by executing the software by CPUs of the information collecting server 141 and the host servers 111, 112.

The application monitoring agent 171 detects the constitutional information and performance deterioration concerning the application 115. The host monitoring agent 172 acquires the constitutional information and the performance information concerning the host server 111, the file system 114, the OS 113, the CPU 116, the memory 117 and the ports 118, 119 of the host bus adapter. The storage sub-system monitoring agent 174 acquires the constitutional information and the performance information concerning the storage sub-systems 131, 132 via a port 142 of a host bus adapter, a port 127 of the SAN switch and the SAN switches 121, 122. The information includes information on the ports 133, 134.

The fabric monitoring agent 173 acquires constitutional information and performance information of a fabric constituted by the SAN switches 121, 122 via the port 142 of the host bus adapter and the port 127 of the SAN switch. The information includes information on the ports 123 to 126.

In the present embodiment, the storage sub-system monitoring agent 174 acquires the information of the apparatus via the storage area network. When one of the storage sub-systems 131, 132 is connected to the LAN 104, the information of the storage sub-system via the LAN 104. The fabric monitoring agent 173 may similarly communicate with the storage sub-systems 131, 132 as monitoring targets via the LAN 104 in order to acquire the information from the sub-systems.

Moreover, in the present embodiment, the fabric monitoring agent 173 and the storage sub-system monitoring agent 174 are operated at the information collecting server 141 for exclusive use, but may be operated at any computer. This also applies to the application monitoring agent 171 and the host monitoring agent 172. In the present embodiment, the application monitoring agent and the host monitoring agent are operated at the host server 111, but the agents may be operated at another computer to acquire the performance information of the application by use of communication.

Figure 2:
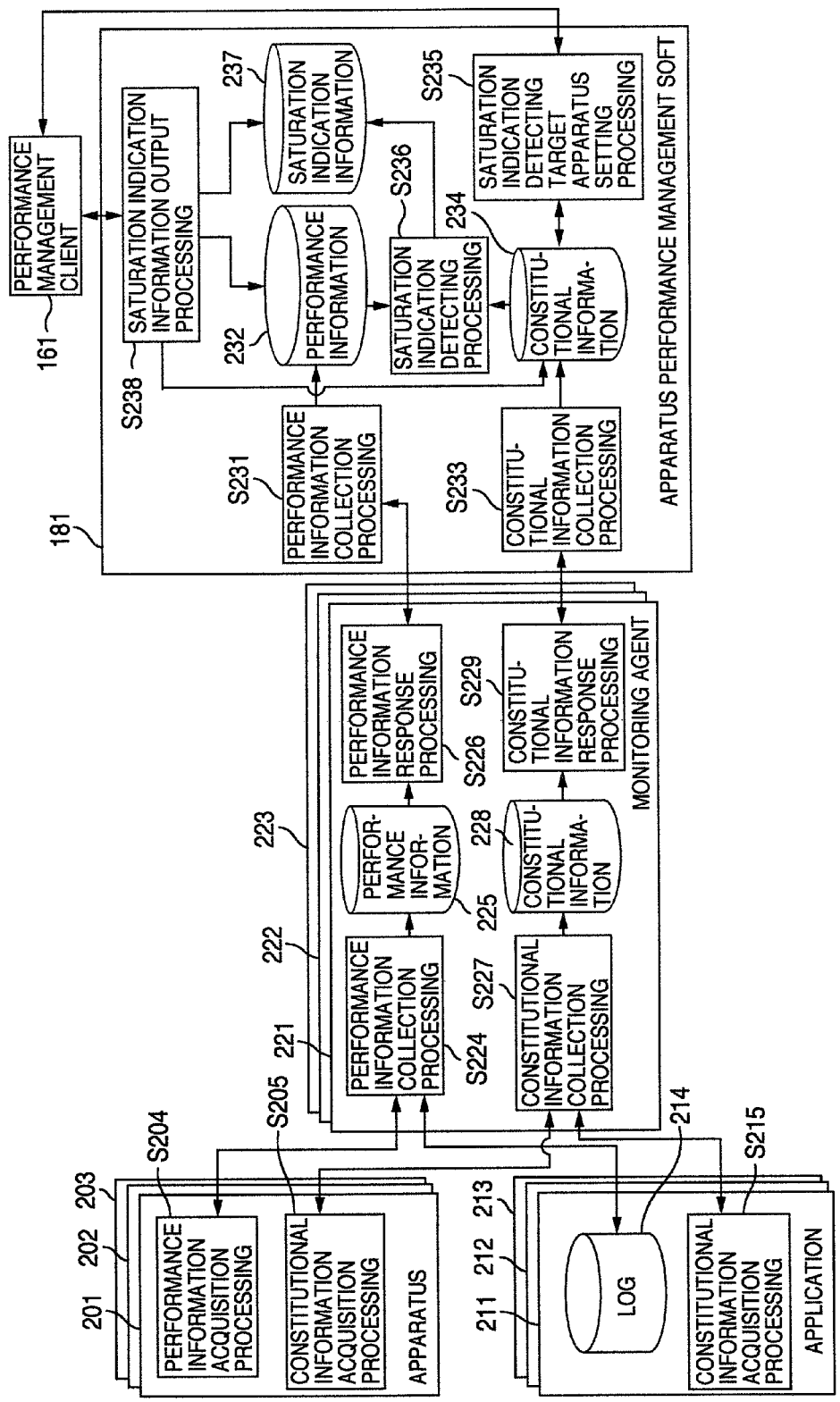
FIG. 2 is a block diagram showing each processing and each information of the present invention.

FIG. 2 is a block diagram showing processing and information of the present invention. As shown in FIG. 2, hardware and software including each processing and each information include apparatuses 201 to 203, applications 211 to 213, monitoring agents 221 to 223, the apparatus performance management software 181 and the performance management client 161.

The apparatuses 201 to 203 are hardware as a target of performance monitoring in a network constituted by an apparatus group. In the example shown in FIG. 1, the apparatuses correspond to any one of the host servers 111, 112, the storage sub-systems 131, 132 and the SAN switches 121, 122.

The applications 211 to 213 are software which uses the apparatus as a performance management target. In the example of FIG. 1, each of the applications corresponds to the application 115.

The monitoring agents 221 to 223 are software which acquires performance information and constitutional information from the apparatuses 201 to 203 constituting the network or the applications 211 to 213 which process the data by use of the apparatuses. In the example of FIG. 1, the agents correspond to any one of the application monitoring agent 171, the host monitoring agent 172, the fabric monitoring agent 173 and the storage sub-system monitoring agent 174.

The software of the apparatuses 201 to 203 includes performance information acquisition processing S204 and constitutional information acquisition processing S205. Each of the applications 211 to 213 includes constitutional information acquisition processing S215, and outputs the performance of the application to a log 214. Each of the monitoring agents which monitor the software or the application of the apparatus includes performance information collection processing S224, performance information 225, performance information response processing S226, constitutional information collection processing S227, constitutional information 228 and constitutional information response processing S229.

The apparatus performance management software 181 includes performance information collection processing S231, performance information 232, constitutional information 234, saturation indication detecting target apparatus setting processing S235, saturation indication detection processing S236, saturation indication information 237 and saturation indication information output processing S238.

The apparatus constituting the network includes an apparatus of a smaller unit constituting the apparatus. Moreover, logical existence which abstracts the apparatus is sometimes generated. The logical existence which abstracts the apparatus will hereinafter be referred to as a logical unit. A dependency relation of the performance is established among the apparatus, the logical unit and the application operating in the apparatus.

A system including the monitoring agents 221 to 223 and the apparatus performance management software 181 collects the performance information and the constitutional information of the apparatus, the logical unit and the application, and detects saturation indication of the apparatus. This processing will generally be described with reference to FIGS. 35 to 38.

Figure 35:
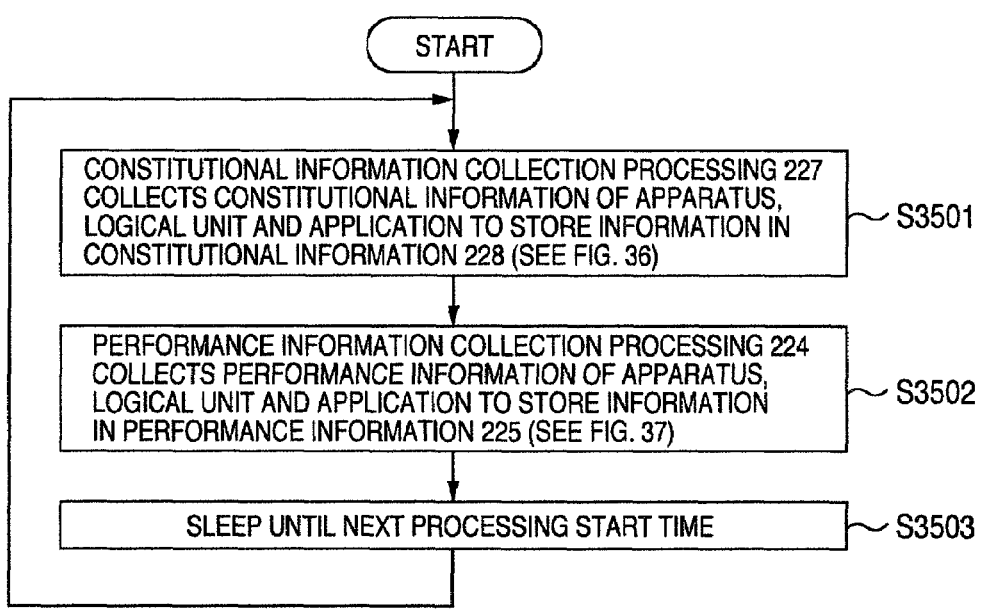
FIG. 35 is a flow chart showing processing of a monitoring agent which acquires and stores the constitutional information and the performance information.

FIG. 35 is a flow chart showing processing of the monitoring agent which acquires and stores the constitutional information and the performance information. The monitoring agents 221 to 223 collect the constitutional information. Specifically, the constitutional information collection processing S227 collects the constitutional information of the apparatus, the logical unit and the application to store the information in the constitutional information 228 (step S3501), and advances to the next step. The monitoring agents 221 to 223 collect the performance information. Specifically, the performance information collection processing S224 collects the performance information of the apparatus, the logical unit and the application, stores the information in the performance information 225 (step S3502), and sleeps until a predetermined time (step S3503). This cycle can be repeated to collect the information periodically.

Figure 36:
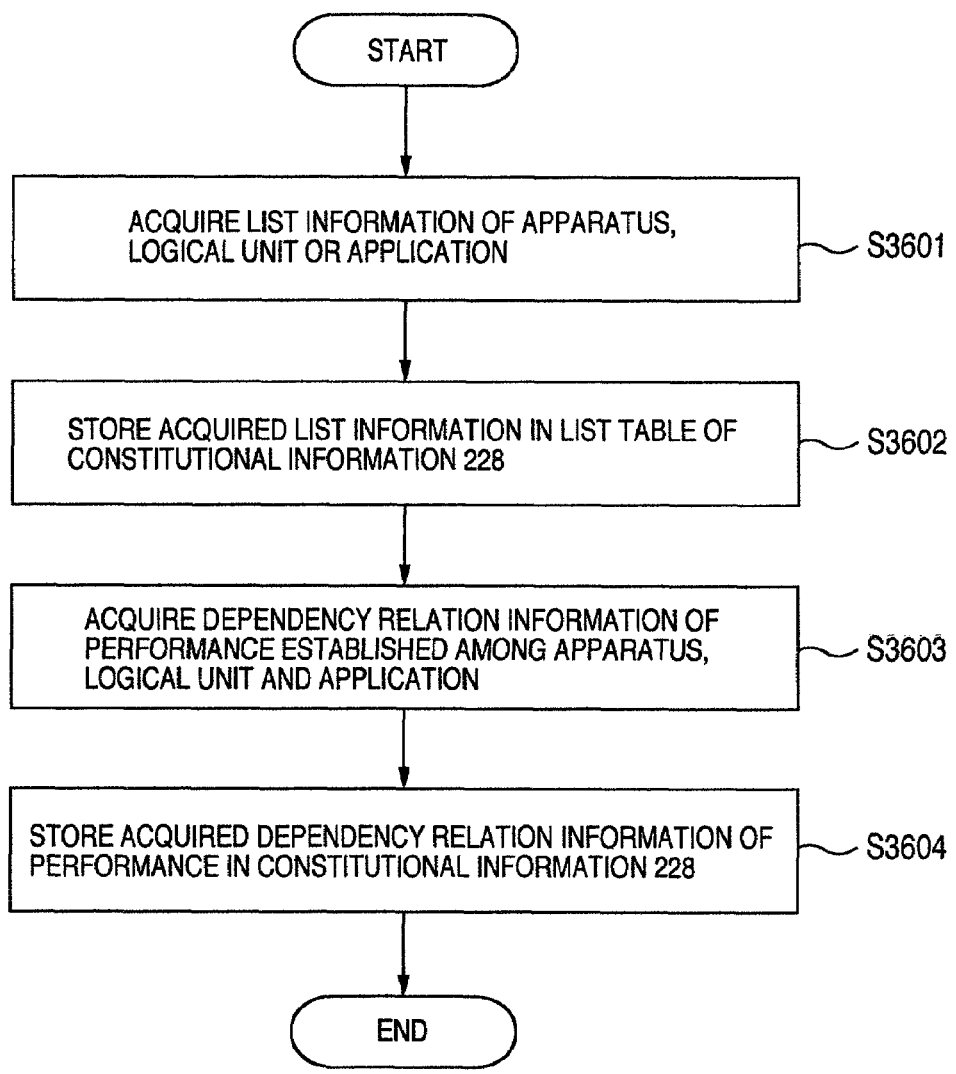
FIG. 36 is a flow chart showing details of constitutional information collection processing of the monitoring agent.

FIG. 36 is a flow chart showing details of the constitutional information collection processing of the monitoring agent. The constitutional information collection processing S227 (step S3501) of the monitoring agents 221 to 223 first inquires the constitutional information acquisition processing S205 of the apparatus or the constitutional information acquisition processing S215 of the application, acquires list information of the apparatus, the logical unit or the application (step S3601), and stores the acquired list information in the constitutional information 228 (step S3602). Subsequently, the constitutional information collection processing S227 of the monitoring agents 221 to 223 inquires the constitutional information acquisition processing S205 of the apparatus or the constitutional information acquisition processing S215 of the application to acquire dependency relation information of the performance established among the apparatus, the logical unit and the application (step S3603), and stores the acquired dependency relation information of the performance in the constitutional information 228 (step S3604).

Figure 37:
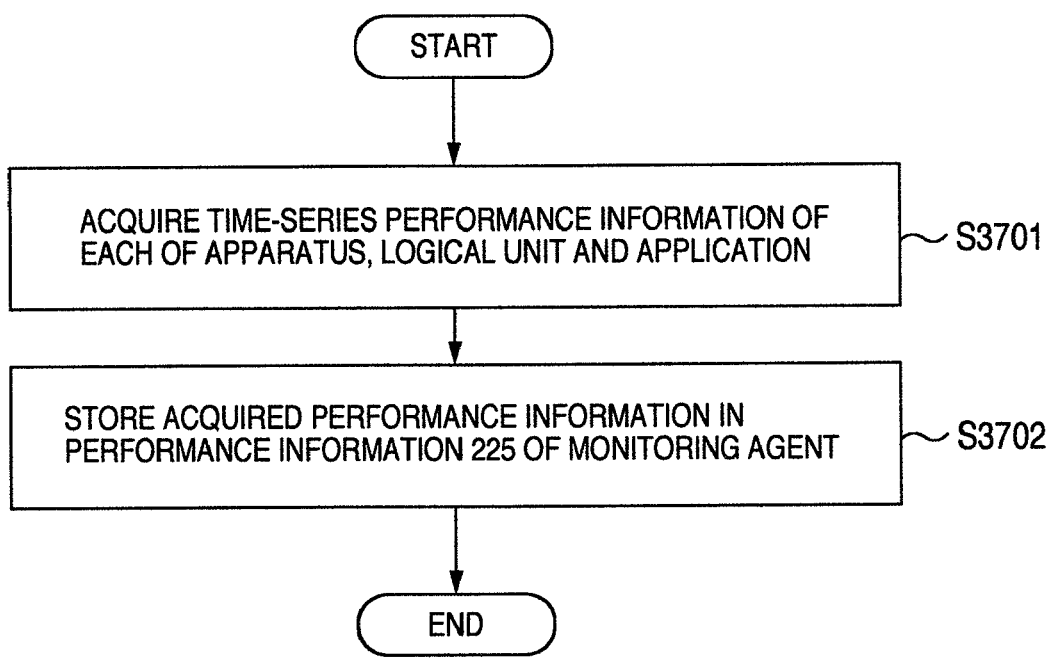
FIG. 37 is an example of a flow chart showing details of performance information collection processing of the monitoring agent.

FIG. 37 is an example of a flow chart showing details of the performance information collection processing of the monitoring agent. The performance information collection processing S224 (step S3502) of the monitoring agents 221 to 223 first inquires the performance information acquisition processing S204 of the apparatus, or acquires and analyzes the log 214 of the application by communication to acquire time-series performance information of each of the apparatus, the logical unit and the application (step S3701). Subsequently, the acquired performance information is stored in the performance information 225 of the monitoring agent (step S3702).

In the constitutional information, contents of the dependency relation information of the performance among the apparatus, the logical unit and the application retained by the monitoring agent will be described later. Information of a result of the collection of the list information of the apparatus, the logical unit and the application and the performance information of the apparatus, the logical unit and the application from the monitoring agent by the apparatus performance management software 181 will be described later.

FIG. 38 is a flow chart showing main processing of the saturation indication detection processing of the apparatus performance management software. FIG. 38 shows main processing performed until the saturation indication of the apparatus is detected using the constitutional information and the performance information stored by the monitoring agents 221 to 223. After the constitutional information is acquired from the monitoring agents 221 to 223, the information is stored in a storage area of the apparatus performance management software 181 (steps S3801, S3802). Specifically, constitutional information collection processing S233 of the apparatus performance management software 181 requests that constitutional information collected by each monitoring agent be transmitted by the constitutional information response processing S229 of the monitoring agent. When the required information is searched from the constitutional information 228 of the monitoring agent and returned, the list information of the apparatus, the logical unit and the application is stored on the constitutional information 234 of the apparatus performance management software 181 (step S3801). Similarly, the dependency relation information of the performance established among the apparatus, the logical unit and the application is stored (step S3802).

Subsequently, the performance information is acquired from the monitoring agents 221 to 223 and stored in the storage area of the apparatus performance management software 181 (step S3803). Specifically, the performance information collection processing S231 of the apparatus performance management software 181 requests that the performance information collected by each monitoring agent be transmitted by the performance information response processing S226 of the monitoring agent. When the requested information is searched from the performance information 225 of the monitoring agent and returned, time-series performance information of each of the apparatus, the logical unit and the application is stored in the performance information 232 of the apparatus performance management software 181. The saturation indication detection processing S236 of the apparatus performance management software 181 searches for apparatus list information stored in the constitutional information 234, and selects an apparatus group as a target to be subjected to saturation harmony detection from all the apparatuses (step S3804). Processing to set the apparatus as a target of the saturation indication detection is the saturation indication detecting target apparatus setting processing S235 described later. With respect to the apparatus selected as the target to be subjected to the saturation harmony detection of the step S3804, presence of saturation indication is detected based on the performance information 232, and the detected saturation indication information is stored in the saturation indication information 237 (step S3805). Moreover, the processing sleeps until a predetermined time (step S3806). A cycle of the steps S3801 to S3806 can be repeated to detect the saturation indication of the apparatus periodically.

The periodic processing has been described above with reference to the flow chart of the apparatus performance management software 181, but the present invention may be executed on receiving an input from an apparatus manager who uses the apparatus performance management software 181.

Processing of the apparatus performance management software 181 which is not described in the flow chart of FIG. 38 includes the saturation indication detecting target apparatus setting processing S235 and the saturation indication information output processing S238. The saturation indication detecting target apparatus setting processing S235 is processing to update the apparatus list information stored in the constitutional information 234 and set a flag to the apparatus set as the saturation indication detecting target.

Moreover, the saturation indication information output processing S238 is processing to output a calculation result of the saturation indication detection processing S236 via the performance management client 161 to notify the manager of the result. The saturation indication detecting target apparatus setting processing S235 and the saturation indication information output processing S238 may be executed, on receiving the input from the apparatus manager who uses the apparatus performance management software 181.

Figure 3:
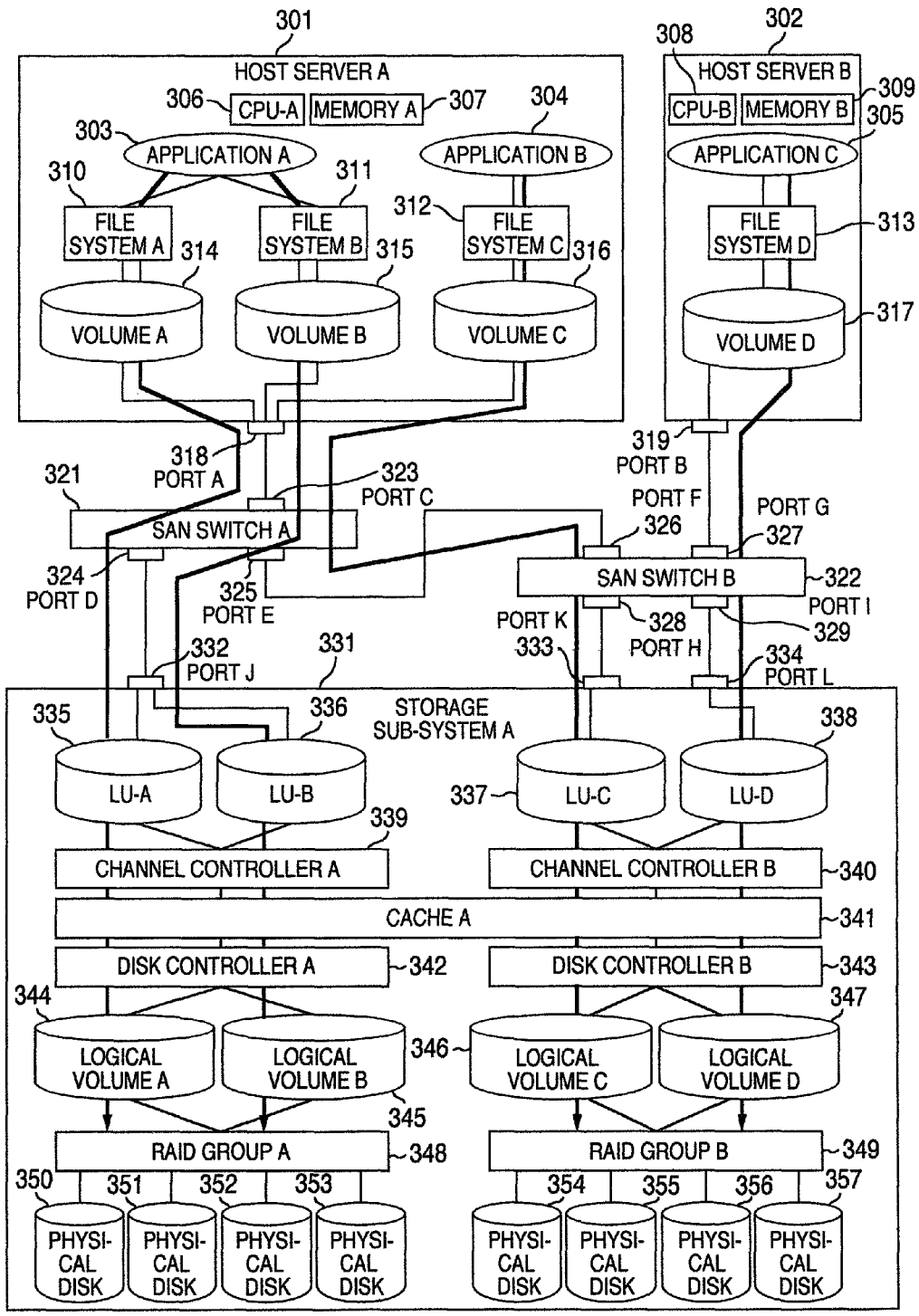
FIG. 3 is an explanatory view showing an example of a dependency relation of performance established among an apparatus, a logical unit and an application which operates on the apparatus.

FIG. 3 is an explanatory view showing an example of the dependency relation of the performance established among the apparatus, the logical unit and the application which operates at the apparatus. Here, reference numerals of constituting components are described in parentheses to clarify names and reference numerals of the constituting components. In a constitution example of the network shown in FIG. 3, as hardware, a fabric including two host servers of a host server A (301) and a host server B (302) and two SAN switches of a SAN switch A (321) and a SAN switch B (322), and one storage sub-system of a storage sub-system A (331) are arranged.

In the host server A (301), an application A (303) and an application B (304) operate. The host server A (301) includes a CPU-A (306) and a memory A (307), and also includes a file system A (310) to a file system C (312) and a volume A (314) to a volume C (316). The volume A (314) is a virtual disk mounted so that an I/O command can be issued to an LU-A (335) described later. This also applies to the volume B (315) and the volume C (316), and the volumes are virtual disks on which an LU-B (336) and an LU-C (337) are mounted, respectively. The host server A includes one host bus adapter (318). In the following description, the number (318) is referred to as the port A.

In the host server B (302), an application C (305) operates in the same manner as in the host server A. The host server B (302) includes a CPU-B (308) and a memory B (309), and also includes a file system D (313) and a volume D (317). The host server B includes one host bus adapter (319). In the following description, the number (319) is referred to as the port B.

The SAN switch A (321) includes switch ports (323) to (325). Among the ports of the SAN switch A (321), in the following description, the number (323) is the port C, the number (324) is the port D, and the number (325) is the port E.

This also applies to the SAN switch B (322). The SAN switch B (322) includes ports (326) to (329). The ports (326), (327), (328) and (329) are hereinafter referred to as the ports F, G, H and I.

The storage sub-system A (331) include physical disks (350) to (357). A virtual disk RAID-constituted by the physical disks (350) to (353) is an RAID group A (348), and a virtual disk RAID-constituted by the physical disks (354) to (357) is an RAID group B (349). The RAID group A (348) sliced into sizes to be easily used by an upper server results in a logical volume A (344) and a logical volume B (345). Similarly, the RAID group B (349) is sliced into a logical volume C (346) and a logical volume D (347). An existence opened to the public so that the logical volume A (344) can be accessed from the server via a port J (332) is the LU-A (335). Similarly, existences of the logical volume B (345), the logical volume C (346) and the logical volume D (347) opened to the public are the LU-B (336), the LU-C (337) and an LU-D (338).

A channel controller A (339) of the storage sub-system A (331) is a CPU which controls exchange of data between the port J (332) and a cache A (341). Similarly, a channel controller B (340) is a CPU which controls exchange of data among a port K (333), a port L (334) and the cache A (341). A disk controller A (342) is a CPU which controls exchange of data between the RAID group A (348) and the cache A (341). Similarly, a disk controller B (343) is a CPU which controls exchange of data between the RAID group B (349) and the cache A (341).

In FIG. 3, the apparatuses are the host server A (301), the CPU-A (306), the memory A (307), the port A (318), the host server B (302), the CPU-B (308), the memory B (309), the port B (319), the SAN switch A (321), the ports C (323) to E (325), the SAN switch B (322), the port F (326) to the port I (329), the storage sub-system A (331), the port J (332) to the port L (334), the channel controllers A (339) and B (340), the cache A (341), the disk controllers A (342) and B (343), the RAID groups A (348) and B (349) and a group of the physical disks (350 and 351). In FIG. 3, the logical units are the file system A (310) to the file system D (313), the volume A (314) to the volume D (317), the LU-A (335) to the LU-D (338) and the logical volume A (344) to the logical volume D (347).

In FIG. 3, each bold line drawn among the apparatus, the logical unit and the application indicates the dependency relation of the performance. In the example of FIG. 3, the application A (303) performs input/output (I/O) processing with respect to the file system A (310) and the file system B (311). In this case, the application A (303) applies loads of I/O to the file system A (310) and the file system B (311), and the application A (303) has a dependency relation of a load on the performance with respect to the file system A (310) and the file system B (311). A line connecting the file system A (310) to the volume A indicates an arrangement relation between the file system A and the volume A. This relation indicates a dependency relation of the load on the performance. This is because, when the application operates the file system A, the operation is connected to the volume A. Lines connecting the volumes A to C to the port A similarly indicate a dependency relation of the performance.

The volume A (314) is constituted by mounting the LU-A (335) of the storage sub-system A (331) on the host server A (301). Therefore, when the application A (303) issues the I/O command, an access to the LU-A (335) is processed by the storage sub-system A (331). It can therefore be considered that the LU-A (335) is a substitute existence for the application A (303) of the storage sub-system A (331) and is one of consumers which use the apparatuses of the storage sub-system A (331). Among the apparatuses of the storage sub-system A (331), the LU-A (335) is concerned with apparatuses such as the channel controller A (339), the cache A (341), the disk controller A (342), the RAID group A (348) and the physical disk groups (350) to (353), and the apparatuses have the dependency relation of performance with respect to the LU-A (335).

When a pair of the volume of the host server and the LU of the storage sub-system on which the volume is mounted is determined, as a transfer path of input/output data to be exchanged between the volume and the LU, the port of the host bus adapter, the port group of the SAN switch and the port of the storage sub-system are determined. Since the load of the input/output on the volume of the host server is a load of communication with respect to the port of the path, there is the dependency relation of the performance between the volume of the host server and the port of the path. In the example of FIG. 3, the LU constituting the pair with the volume A (314) is the LU-A (335). The port A (318), the port C (323), the port D (324) and the port J (332) which are the ports of a path between the volume A (314) and the LU-A (335) have the dependency relation of the performance with respect to the volume A (314).

The contents of the constitutional information of the monitoring agent will be described with reference to FIGS. 4A to 9.

FIGS. 4A to 4D are explanatory views showing tables included in the constitutional information of each monitoring agent. As shown in FIGS. 4A to 4D, each of the application monitoring agents 171 to 174 includes, in the constitutional information 228, a table in which the list information of the apparatus, the logical unit and the application to be monitored by the agent is stored and a table in which the dependency relation information among the apparatus, the logical unit and the application is stored.

In an example shown in FIG. 4A, the application monitoring agent 171 stores the list information of monitoring target applications in an application list table 402, and stores information indicating the file system to be used by the application in a table 401 of association between the application and the file system.

Similarly, in an example shown in FIG. 4B, the host monitoring agent 172 stores list information of the file system, the volume and the host port as monitoring targets in a file system list table 413, a volume list table 414 and a host port list table 415, respectively, and stores dependency relation information of performances established between the monitoring targets in a table 411 of association between the file system and the volume and a table 412 of association among the volume, the LU and the host port.

Similarly, in an example shown in FIG. 4C, the fabric monitoring agent 173 stores list information of the SAN switch ports as monitoring targets in an SAN switch port list table 422, and stores a port group of a communication path between the host-side port and the storage port in a table 421 of the communication path between the host port and the storage port.

Similarly, in an example shown in FIG. 4D, the storage sub-system monitoring agent 174 stores the list information on each type of the storage port, the LU, the channel controller, the cache, the disk controller, the logical volume and the RAID group as the monitoring targets in list tables 432 to 438 for each type. Dependency relation information of the performance established between the LU and the constituting elements of the storage sub-system having the dependency relation of the performance with respect to the LU is stored in a table 431 of association between the LU and the constituting elements of the storage sub-system.

FIG. 5 is an explanatory view showing a structure of a table of association between the application and the file system. The table shown in FIG. 5 shows one example of a structure of the table 401 of the association between the application and the file system (see FIG. 4A) stored in the constitutional information 228 of the application monitoring agent 171. In the table 401 of the association between the application and the file system, the dependency relation of the performance between the application and the file system is recorded. The table has an application column 501 to store identification information of the application and a file system column 502 to store identification information of the file system. Each row of the table corresponds to a set of the application and the file system having the dependency relation. Specifically, it is seen that, in an example of the dependency relation of the performance shown in FIG. 3, the application A (303) which operates at the host server A (301) has the dependency relation of the performance with respect to the file system A (310) and the file system B (311).

FIG. 6 is an explanatory view showing a structure of the table of the association between the file system and the volume. The table shown in FIG. 6 shows one example of a structure of the table 411 of the association between the file system and the volume stored in the constitutional information 228 of the host monitoring agent 172. In the table 411 of the association between the file system and the volume, the dependency relation of the performance between the application and the file system is recorded. The table includes a file system column 601 to store identification information of the file system and a volume column 602 to store identification information of the volume. Each row of the table corresponds to a set of the file system and the volume having the dependency relation. Specifically, in the example of the dependency relation of the performance shown in FIG. 3, the file systems A (310), B (311) and C (312) which operate at the host server A (301) have the dependency relations of the performances with respect to the volumes A (314), B (315) and C (316), respectively.

FIG. 7 is an explanatory view showing a structure of the table of the association among the volume, the LU and the host port. The table shown in FIG. 7 shows one example of the structure of the table 412 of the association among the volume, the LU and the host port (see FIG. 4B). In the table 412 of the association among the volume, the LU and the host port, a correspondence between the volume of the host and the LU of the storage sub-system and a correspondence with respect to the host port for use in access are recorded. The table has a volume column 701 to store identification information of the volume, an LU column 702 to store identification information of the LU, an LU holding storage sub-system column 703 to store identification information of the storage sub-system which holds the LU and a host port column 704 to store identification information of the host port for use in the access. Each row of the table corresponds to a set of the volume, the LU and the port having the dependency relation. Specifically, in the example of the dependency relation of the performance shown in FIG. 3, the host server A (301) has the dependency relation of the performance with respect to the LU-A (335), the storage sub-system A (331) which holds the LU and the port A (318).

FIG. 8 is an explanatory view showing a structure of a table of a communication path between the host port and the storage port. The table of FIG. 8 shows one example of a structure of the table 421 of the communication path between the host port and the storage port (see FIG. 4C) stored in the constitutional information 228 of the fabric monitoring agent 173. In the table 421 of the communication path between the host port and the storage port, information of a transfer path between the volume of the host and the LU of the storage sub-system is recorded. The table includes a host port column 801 to store identification information of the host port, a storage port column 802 to store identification information of the storage port and a communication path column 803 to store a list of SAN switch port identification information indicating the path from the host port to the storage port. Each row of the table corresponds to a set of the host port, the SAN switch port and the storage port having the dependency relation. Specifically, in the example of the dependency relation of the performance shown in FIG. 3, it is seen that the port A (318) is connected to the port J (332) via the port C (323) and the port D (324).

FIG. 9 is an explanatory view showing a structure of the table of the association between the LU and elements of the storage sub-system. The table shown in FIG. 9 shows one example of the structure of the table 431 (see FIG. 4D) of association between the LU and the constituting elements of the storage sub-system stored in the constitutional information 228 of the storage sub-system monitoring agent 174. In the table 431 of the association between the LU and the constituting elements of the storage sub-system, a correspondence between the LU of the storage sub-system and the elements of the storage sub-system is recorded. The table includes an LU column 901 to store identification information of the LU, a storage port column 902 to store identification information of the storage port, a channel controller column 903 to store identification information of the channel controller, a cache column 904 to store identification information of the cache, a disk controller column 905 to store identification information of the disk controller, a logical volume column 906 to store identification information of the logical volume and an RAID group column 907 to store identification information of the RAID group. Each row of the table corresponds to a set of the LU and elements of each storage device having the dependency relation with respect to the LU. Specifically, it is seen that, in the example of the dependency relation of the performance shown in FIG. 3, the LU-A (335) has a correspondence with respect to the port J (332), the channel controller A (339), the cache A (341), the disk controller A (342), the logical volume A (344) and the RAID group A (348).

Figure 10:
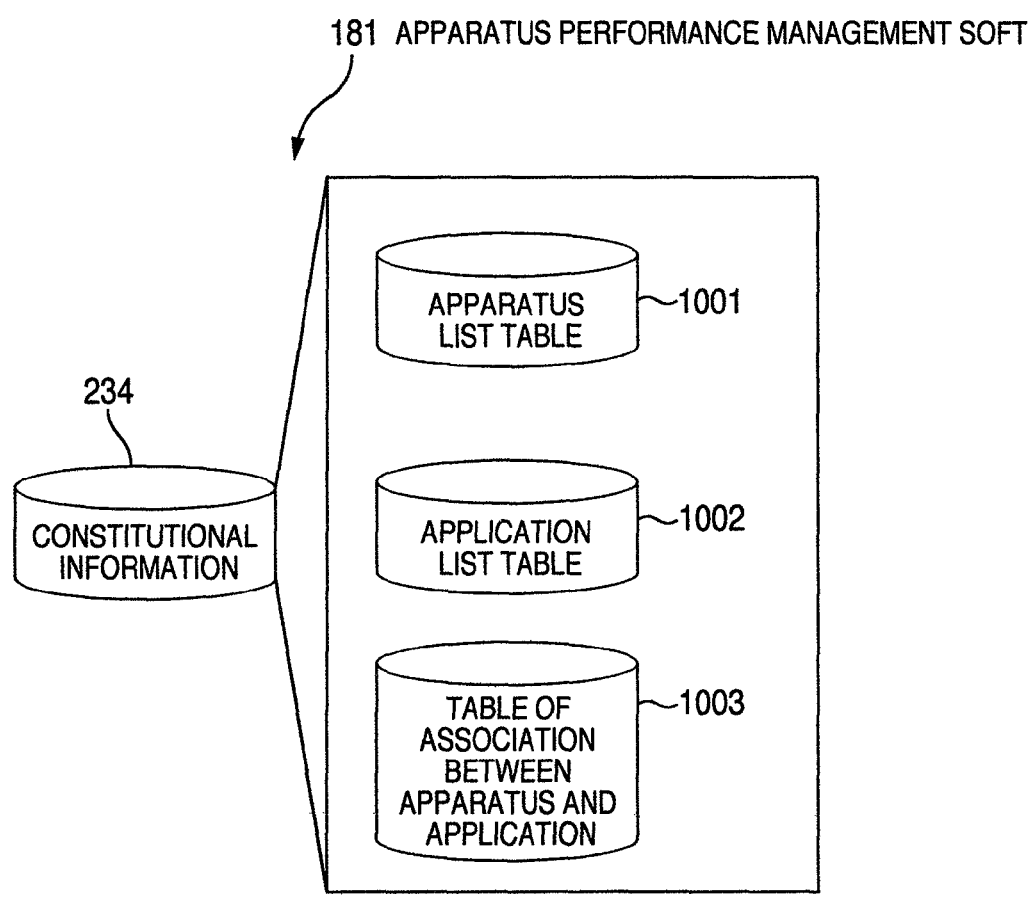
FIG. 10 is a constitution diagram showing a table included in constitutional information of apparatus performance management software according to Embodiment 1.

FIG. 10 is a constitution diagram showing a table included in constitutional information of apparatus performance management software according to Embodiment 1. The information to be stored in the constitutional information 234 of the apparatus performance management software 181 is information obtained by integrating information collected by the monitoring agents shown in FIGS. 5 to 9. As shown in FIG. 10, the constitutional information 234 has an apparatus list table 1001 to store apparatus list information acquired via the monitoring agent, an application list table 1002 to similarly store application list information and an apparatus and application association table 1003 to store information of a correspondence between the apparatus and the application which uses the apparatus. FIG. 10 shows an example of the table required for a case where a correlation between the performance information of the apparatus and the performance information of the application is analyzed in order to detect the saturation indication of the apparatus.

FIG. 11 is an explanatory view showing a structure of the apparatus list table. The table shown in FIG. 11 shows one example of the structure of the apparatus list table 1001 (see FIG. 10). The apparatus list table 1001 is a table obtained by integrating the list information of the apparatuses collected by the apparatus monitoring agents. The table includes an apparatus type column 1101 to store identification information of an apparatus type, an apparatus name column 1102 to store identification information of an apparatus name, a belonging location column 1103 to store identification information of hardware to which the apparatus belongs and a saturation indication detecting target column 1104 to determine whether or not the apparatus is set as the saturation indication detecting target. The saturation indication detecting target column 1104 will be described in detail with reference to FIG. 16. Specifically, it is seen that the apparatus group list information shown in FIG. 3 is collected and integrated by the apparatus performance management software 181 and that, for example, the CPU-A (306) belongs to the host server A (301) and is the saturation indication detecting target.

FIG. 12 is an explanatory view showing a structure of the application list table. The table shown in FIG. 12 shows one example of the structure of the application list table 1002 (see FIG. 10). The application list table 1002 is a table obtained by integrating application list information collected by the application monitoring agent. The table includes an application column 1201 to store identification information of an application name, a belonging location column 1202 to store identification information of the server at which the application operates and a saturation indication detecting target column 1203 to determine whether or not the application is set as the saturation indication detecting target. The saturation indication detecting target column 1203 will be described in detail with reference to FIG. 16. Specifically, it is seen that the apparatus performance management software 181 collects and integrates the list information of the application group shown in FIG. 3 and that, for example, the application A (303) belongs to the host server A (301) and is the saturation indication detecting target.

FIG. 13 is an explanatory view showing a structure of the table of the association between the apparatus and the application. The table shown in FIG. 13 shows one example of the structure of the table 1003 (see FIG. 10) of the association between the apparatus and the application. The table 1003 of the association between the apparatus and the application is a table obtained by combining association information among the apparatus, the logical unit and the application collected by the monitoring agent and integrating the dependency relation of the performance established between the apparatus and the application. The table includes an apparatus type column 1300 to store identification information of an apparatus type, an apparatus name column 1301 to store identification information of an apparatus name, a belonging location column 1302 to store identification information of hardware to which the apparatus belongs, an application name column 1303 to store identification information of a name of the application having the dependency relation of the performance between the application and the apparatus and a belonging location column 1304 to store identification information of the server at which the application operates. Specifically, in the example of the dependency relation of the performance shown in FIG. 3, it is seen that a relation between each apparatus and the application is calculated from the information collected by the monitoring agent, and stored in the table 1003 of the association between the apparatus and the application. It is seen that, for example, the CPU-A (306) belongs to the host server A (301), the application A (303) belongs to the host server A (301) and the CPU-A (306) and the application A (303) have the dependency relation of the performance.

An outline of a method for calculating the relation between each apparatus and the application will be described with reference to FIGS. 3 and 4. Here, a method for finding the application having the dependency relation of the performance with the RAID group.

An LU group having the dependency relation of the performance with the RAID group can be solved in accordance with the table 431 of the association between the LU and the elements of the storage sub-system disposed at the storage sub-system monitoring agent 174. A volume group having the dependency relation of the performance with respect to each of the solved LU groups can be solved according to the table 412 of the association among the volume, the LU and the host port provided at the host monitoring agent 172. A file system group having the dependency relation of the performance with respect to each of the solved volume groups can be solved according to the table 411 of the association between the file system and the volume provided at the host monitoring agent 172. An application group having the dependency relation of the performance with respect to each of the solved file system groups can be solved according to the table 401 of the association between the application and the file system provided at the application monitoring agent 171, In consequence, the application having the dependency relation of the performance with respect to the RAID group can be solved (found) based on the RAID group as a starting point. In FIG. 3, the application having the dependency relation with respect to an apparatus positioned closer to the application than the RAID group can similarly be solved (found).

Figure 14A:
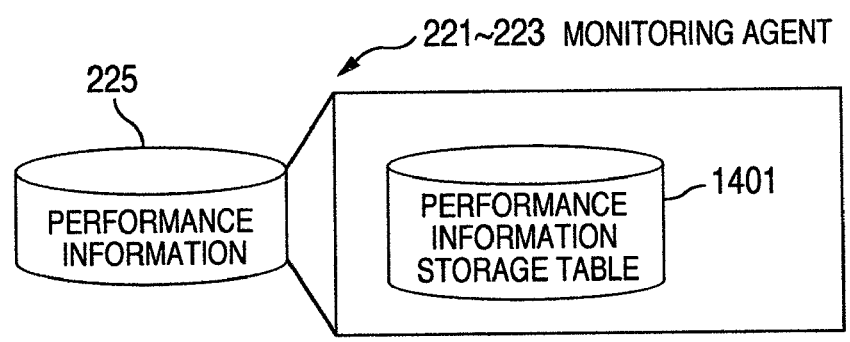
FIG. 14A is an explanatory view showing a structure of a table included in the performance information of the monitoring agent.
Figure 14B:
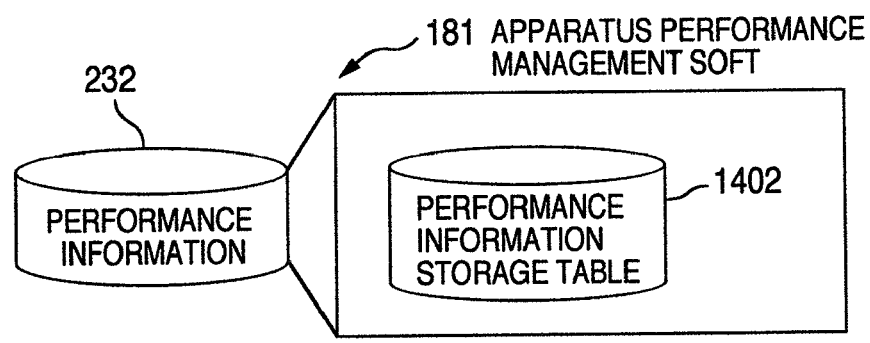
FIG. 14B is an explanatory view showing a structure of a table included in the performance information of the apparatus performance management software.

FIG. 14 shows explanatory views showing structures of tables included in performance information of the monitoring agent and performance information of the apparatus performance management software, respectively. The performance information 225 (see FIG. 2) of the monitoring agents 221 to 223 include a performance information storage table 1401 in which time-series performance information of the monitoring target of the monitoring agent is stored. The performance information 232 (see FIG. 2) of the apparatus performance management software 181 includes a performance information storage table 1402 in which the performance information collected from the monitoring agents by the apparatus performance management software 181 is stored.

FIG. 15 is an explanatory view showing a structure of the performance information storage table. The table of FIG. 15 shows one example of the structure of the performance information storage table 1402 (see FIG. 14) of the apparatus performance management software 181. The performance information storage table 1402 includes a monitoring target type column 1500 to store a monitoring target type including identification information of the application, the logical unit or the apparatus as the monitoring target, a monitoring target name column 1501 to store identification information of a monitoring target name, a belonging location column 1502 to store identification information of hardware where the monitoring target belongs or operates, a performance type column 1503 to store information with which a type of a performance value of the monitoring target is identified, a performance value column 1504 to store a measured performance value and an observation time column 1505 to store an observation time. Specifically, in examples of the apparatus group, the logical unit group and the application group shown in FIG. 3, the apparatus performance management software 181 collects and stores the performance information of the apparatus, the logical unit and the application group. It is to be noted that the structure of the performance information storage table 1401 (see FIG. 14) is similar to that of the performance information storage table 1402, and description thereof is therefore omitted.

The performance information which can be collected and stored in the monitoring agents 221 to 223 and the apparatus performance management software 181 include several types. Examples of the type of the performance information of the application include an amount of the input/output (I/O) command to be issued by the application, an I/O byte amount, a response time or throughput as a service level offered to a user/user program of the application by the application, and a response time or throughput as a service level received by the application from the apparatus.

Since the logical unit can be regarded as a substitute for the application, examples of the type of the performance information of the logical unit include an amount of the I/O command to be issued by the application which uses the logical unit via the logical unit, an I/O byte amount, and a response time or throughput as a service level received by the logical unit the apparatus.

Examples of the type of the performance information of the apparatus include an amount of the I/O command to be processed by the apparatus, an I/O byte amount and a duty factor. Examples of the type of the performance information of the cache include a cache hit rate, and a write pending rate which is a ratio of times when writing in the cache is delayed with respect to the number of the commands to be processed.

FIG. 16A is an explanatory view showing a screen example to determine a saturation indication detecting target from a management target apparatus group, and explanatory views showing contents of an association table in accordance with the determined contents. A saturation indication detecting target setting screen 1601 shown in FIG. 16A is a screen example which is displayed in the performance management client 161 in the saturation indication detecting target apparatus setting processing S235 (see FIG. 2) of the apparatus performance management software 181 and which is to set the saturation indication detecting target from the management target apparatus group. In the screen example, the saturation indication detecting target apparatus setting processing S235 displays, in an area 1603, a list of applications to be monitored by the apparatus performance management software 181. A manager investigates the application in which the apparatus having the dependency relation of the performance is to be set as the performance saturation indication detecting target, and selects the application by use of a check box of an area 1602.

Then, as shown in FIG. 16B, the saturation indication detecting target apparatus setting processing S235 updates a value of the saturation indication detecting target column 1203 of the application list table 1002 (see FIG. 12) in accordance with the contents selected by the manager.

Subsequently, as shown in FIG. 16C, the saturation indication detecting target apparatus setting processing S235 acquires a list of the applications in which the value of the saturation indication detecting target column 1203 of the application list table 1002 is the saturation indication detecting target, limits the apparatus which is not used by any application group by use of the table 1003 of the association between the apparatus and the application (see FIG. 13), and updates the value of the saturation indication detecting target column 1104 of the apparatus list table 1001 (see FIG. 11) so that the value is not set as the saturation indication detecting target. The apparatus which is not limited is updated so as to be set as the saturation indication detecting target.

As shown in FIGS. 16A to 16C, the screen to determine the saturation indication detecting target apparatus in view of the application may be displayed, or the apparatus list may be displayed to display a screen to select whether or not each apparatus is set as the saturation indication detecting target apparatus. In this case, the saturation indication detecting target column 1203 of the application list table 1002 is not required. Such a function does not have to be provided, and all the apparatuses may constantly be set as the saturation indication detecting target apparatuses. In this case, the saturation indication detecting target column 1104 of the application list table 1002 is not required. FIGS. 16A to 16C show the method for selecting the application in the screen, but a method for selecting the application with a setting file or the like may be used.

Next, saturation indication detection processing will be described.

FIG. 17 is a flow chart showing the saturation indication detection processing of apparatus performance management software according to Embodiment 1. The flow chart of the saturation indication detection processing S236 (see FIG. 2) of the apparatus performance management software 181 corresponds to the steps S3804 and S3805 shown in FIG. 38. An outline of the flow chart will hereinafter be described first, and details of main steps will then be described in detail. It is to be noted that the processing of the software of the apparatus performance management software 181 is realized by executing the processing by the CPU of the performance management server 151 (see FIG. 1).

First, in step S1701, a period to analyze a correlation of a change of the performance information between the apparatus and the application is determined, The period may be a range from the current time to a time traced from the current time as much as a specific time or a time range determined by the manager with the screen, the setting file or the like.

Next, in step S1702, a list of the apparatuses to be set as the saturation indication detecting targets is acquired from the apparatus list table 1001 (see FIG. 11). A column to set whether or not each apparatus is to be set as the saturation indication detecting target as in the saturation indication detecting target column 1104 of the apparatus list table 1001 corresponds to processing of extracting the apparatus designated as the saturation indication detecting target, if any. Subsequently, in steps S1703 to S1712, each of the apparatuses acquired in the step S1702 is subjected to loop processing.

In the step S1704, a list of the applications having the dependency relation of the performance with respect to the apparatus is limited and acquired using the table 1003 of the association between the apparatus and the application (see FIG. 13). In the step S1705, the performance information of the apparatus in the period determined in the step S1701 is acquired from the performance information storage table 1402 (see FIG. 15). Subsequently, in the steps S1706 to S1709, each of the applications acquired in the step S1705 is subjected to the loop processing to detect the presence of the saturation indication.

In the step S1707, the performance information of the application in the period determined in the step S1701 is acquired from the performance information storage table 1402. In the step S1708, a correlation coefficient R is measured between the information of the apparatus acquired in the step S1705 and the performance information of the application acquired in the step S1707, and a set of {the identification information of the apparatus, the identification information of the application, the period information determined in the step S1701 and the correlation coefficient R} is stored in a correlation coefficient calculation result table 2001 (see FIG. 21) of the saturation indication information 237 of the apparatus performance management software 181. The correlation coefficient calculation result table 2001 will be described later with reference to FIG. 21. The step S1709 is an end of a loop concerning the application.

In the step S1710, the correlation coefficient R of the performance information between the apparatus and the application, stored in the step S1708, is used as an index indicating a degree of saturation of the apparatus. When the correlation coefficient R exceeds the threshold value, it is judged that the apparatus has given the saturation indication. In a case where it is judged (detected) that the apparatus has given the saturation indication (step S1710, Yes), the processing advances to the step S1711. In a case where it is not judged (detected) that the apparatus has given the saturation indication (step S1710, No), the processing advances to the step S1712.

The step S1711 stores a set of {the identification information of the apparatus judged to have given the saturation indication and the period information determined in the step S1701} in a saturation indication information table 2002 (see FIG. 22) of the saturation indication information 237 of the apparatus performance management software 181. The saturation indication information table 2002 will be described in detail with reference to FIG. 22. It is to be noted that the step S1712 is an end of the loop concerning the apparatus.

Next, details of the main steps will be described.

In the step S1705, as the performance information of the apparatus, the duty factor of the apparatus is used, or the duty factor is calculated from the performance information other than the duty factor in a pseudo manner. Examples of the apparatus from which the duty factor can be acquired include CPU-system apparatuses such as the channel controller and the disk controller containing the CPUs and the CPU of the host server and a disk-system apparatus such as the RAID group. The duty factor cannot be acquired from port-system apparatuses such as the storage port, the host port and the SAN switch port in some case. However, in this case, assuming that a maximum transferable byte amount per unit time of the port is a denominator and that a transfer byte amount per measured unit time is a numerator, the duty factor may be calculated in the pseudo manner. The duty factor of the cache is constantly 100% in many cases. In this case, since the duty factor cannot be the performance information to be referred, a cache hit rate or a write pending rate may be used instead of the duty factor.

In the step S1707, as the performance information of the application, the response time which is the service level offered by the application to the user of the application/the use program or the response time which is the service level received from the application by the apparatus is used.

In the step S1708, change value strings are calculated from the time-series duty factor of the apparatus acquired in the step S1705 and the time-series response time of the application acquired in the step S1707 in the period determined in the step S1701, and the correlation coefficient between the change value strings is calculated. A relation between the duty factor of the apparatus and the response time of the apparatus to the application is generally a relation as shown in a graph of FIG. 18.

Figure 18:
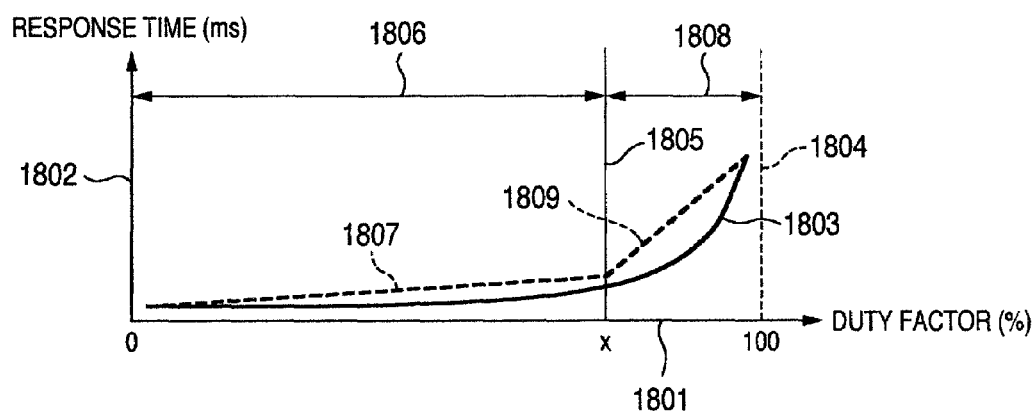
FIG. 18 is an explanatory view showing a relation established between a duty factor of an apparatus and a response time in a case where the application using the apparatus issues a processing request to the apparatus.

FIG. 18 is an explanatory view showing a relation established between the duty factor of the apparatus and the response time in a case where the application using the apparatus issues a processing request to the apparatus. In FIG. 18, an abscissa 1801 indicates the duty factor of the apparatus, an ordinate 1802 indicates the response time of the apparatus to the application, and a curve 1803 indicates a relation between the duty factor and the response time. An ordinate 1804 indicates that the duty factor is 100%, and an ordinate 1805 indicates that the duty factor is a certain value X %. In a range denoted with 1806, that is, a duty factor of 0% to X %, even if the duty factor increases, the response time does not increase. In this case, a change of the response time only slightly responds to a change of the duty factor, random properties are easily generated in the duty factor change and the response time change, and the correlation easily lowers. In a range denoted with 1808, that is, a duty factor of X % to 100%, as the duty factor increases, the response time largely increases. In this case, the response time change sharply responds to the duty factor change, and a correlation between the duty factor change and the response time change easily enlarges.

An example of a method for calculating the correlation coefficient will hereinafter be described.

Figure 19:
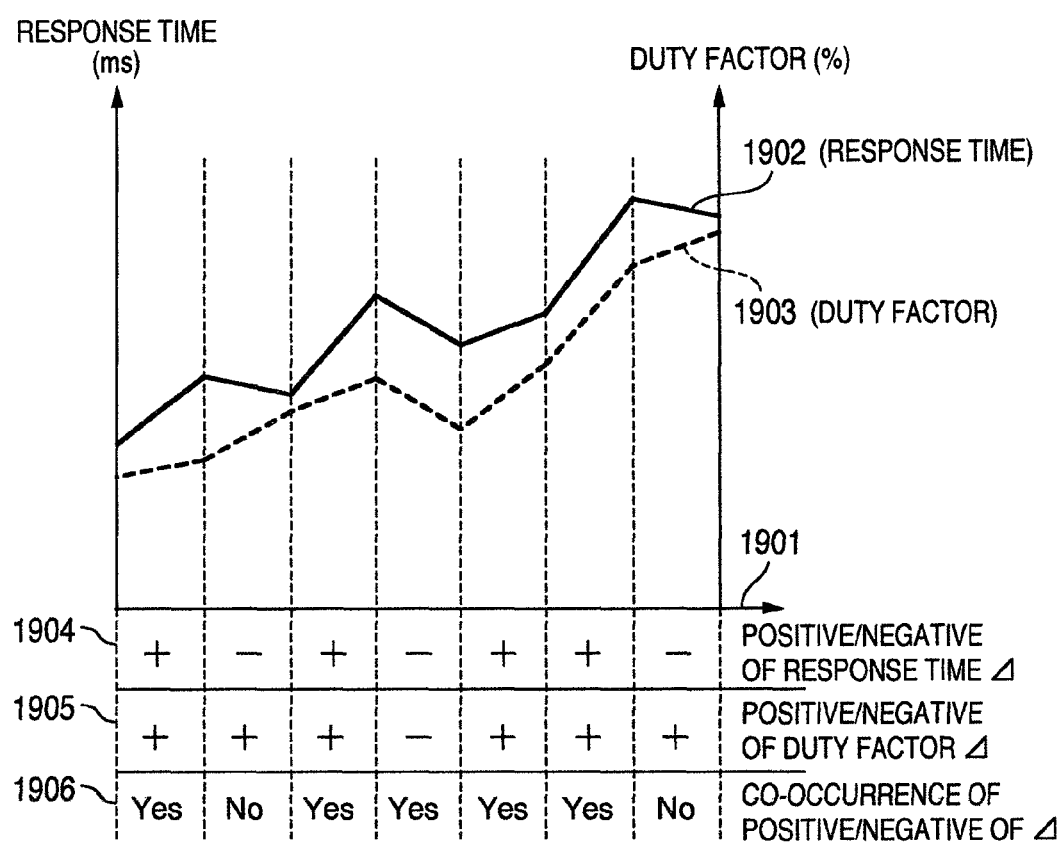
FIG. 19 is an explanatory view showing an example in which a correlation between the duty factor of the apparatus and the response time in a case where the application using the apparatus issues the processing request to the apparatus is analyzed, depending on whether a change value is positive or negative.

FIG. 19 is an explanatory view showing an example in which a correlation between the duty factor of the apparatus and the response time in a case where the application using the apparatus issues the processing request to the apparatus is analyzed, depending on whether the change value is positive or negative. As shown in FIG. 19, positive or negative change amounts of the duty factor and the response time with elapse of time is calculated, and the correlation coefficient can be calculated using a co-occurrence ratio of the change amounts.

An abscissa 1901 of a graph shown in FIG. 19 indicates time. A polygonal line 1902 indicates a change of the response time with the elapse of time, and a polygonal line 1903 indicates a change of the duty factor with the elapse of time. An area 1904 indicates that the change amount of the response time with the elapse of time is positive or negative. Similarly, an area 1905 indicates that the change amount of the duty factor with the elapse of time is positive or negative. An area 1906 indicates whether or not the positive or negative change amounts of the response time and the duty factor co-occur. The correlation coefficient R can be obtained using a ratio of the number of co-occurrences to the total number. For example, in the area 1906, the number of the co-occurrences (the number of Yes) is five among seven. Therefore, the correlation coefficient R can be calculated as 71.4%.

As a method in which the positive and negative signs are not used, the correlation coefficient between the time-series change values of the response time and the duty factor can be measured to obtain the correlation coefficient R. To improve probability, a method is considered in which the change amount with the elapse of time is no used in calculation of the correlation coefficient in a case where the amount is smaller than a specific threshold value.

When the apparatus is a cache, the cache hit rate may be used instead of the duty factor. Conversely to the duty factor, when the cache hit rate comes close to 0%, the service level with respect to the application drops. To solve the problem, in a case where the correlation between the change value of the cache hit rate and the change value of the service level is analyzed, the positive and negative signs of the correlation coefficient are reversed, and the coefficient is compared with the threshold value.

Turning back to FIG. 17, in the step S1710, in a case where one apparatus is used by a plurality of applications, a plurality of correlation coefficients R calculated between the apparatus and each application are obtained. In this case, each application is weighed, and a weighted average of the plurality of correlation coefficients R is obtained. In consequence, the plurality of correlation coefficients can be integrated. The weight of one specific application in which the response time is to be regarded as important or the weight of the plurality of applications can be set to be large, and the weight of another application can be set to be small. In the step S1710, the correlation coefficient between the performance information of the apparatus and the performance information of the application (group) using the apparatus, calculated by the method, is regarded as the degree of saturation concerning the apparatus. When the correlation coefficient exceeds the threshold value, it is judged that the apparatus has given the saturation indication. The threshold value may be fixed in the system or may be set in accordance with the screen, the setting file or the like.

Figure 20:
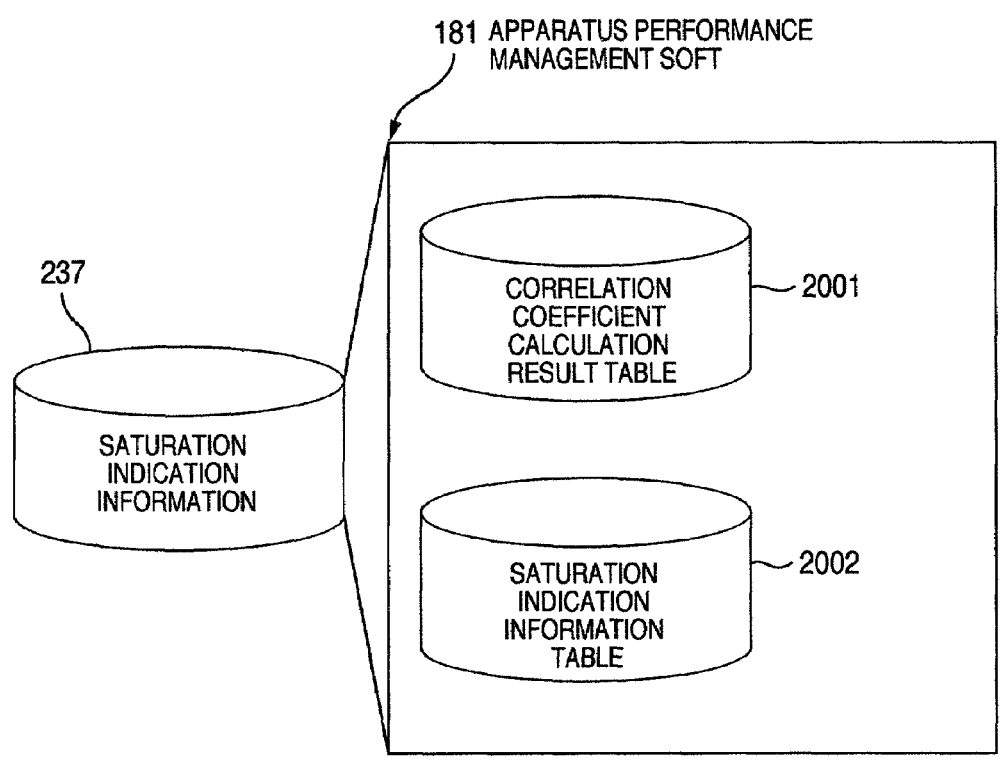
FIG. 20 is a constitution diagram showing a table included in saturation indication information of the apparatus performance management software.

FIG. 20 is a constitution diagram showing a table included in the saturation indication information of the apparatus performance management software. The saturation indication information 237 of the apparatus performance management software 181 includes the correlation coefficient calculation result table 2001 and the saturation indication information table 2002.

FIG. 21 is an explanatory view showing a structure of the correlation coefficient calculation result table according to Embodiment 1. The table shown in FIG. 21 shows one example of the structure of the correlation coefficient calculation result table 2001 (see FIG. 20) of the apparatus performance management software 181. In the correlation coefficient calculation result table 2001, the correlation coefficient of the performance information calculated for each set of the apparatus, the application and the period is stored. The correlation coefficient calculation result table 2001 includes an apparatus type column 2100 to store identification information of an apparatus type, an apparatus name column 2101 to store identification information of an apparatus name of the apparatus type, a belonging location column 2102 to store identification information of hardware to which the apparatus belongs, an application name column 2103 to store application identification information of an application name, a belonging location column 2104 to store server identification information of a server where the application operates and belongs, a start time column 2105 to store start time information and an end time column 2106 to store end time information so that period information of the performance information used in the calculation of the correlation coefficient is stored, and a correlation coefficient column 2107 to store the correlation coefficient which is a calculation result.

Specifically, it is seen that, in the example of the dependency relation of the performance shown in FIG. 3, the correlation coefficient between the CPU-A (306) and the application A (303) is calculated for a correlation coefficient calculation period of two hours from the start time 10:00:00 of Jan. 22, 2007 till the end time 12:00:00 of Jan. 22, 2007, and the correlation coefficient is 0.53.

FIG. 22 is an explanatory view showing a structure of the saturation indication information table. The table shown in FIG. 22 shows the structure of the saturation indication information table 2002 (see FIG. 20) which is a table for storing information of the apparatus having the saturation indication detected. The saturation indication information table 2002 includes an apparatus type column 2200 to store identification information of an apparatus type, an apparatus name column 2201 to store identification information of an apparatus name of the apparatus type, a belonging location column 2202 to store identification information of hardware to which the apparatus belongs and a start time column 2203 to store start time information and an end time column 2204 to store end time information for storing period information used in the calculation of the correlation coefficient.

Specifically, assuming that the threshold value of the correlation coefficient is 0.30, when the correlation coefficient exceeds the threshold value, it is judged that the apparatus gives the saturation indication. In this case, since the table shown in FIG. 21 indicates that the correlation coefficient of the disk controller A is 0.20, it is not judged that the disk controller A has given the saturation indication. According to a judgment result, the saturation indication information on the disk controller A is not stored in the table shown in FIG. 22.

FIG. 23 is an explanatory view showing a screen example output by the saturation indication information output processing of the apparatus performance management software according to Embodiment 1. A screen 2301 output by the saturation indication information output processing S238 of the apparatus performance management software 181 includes one table. The table includes an apparatus type column 2302 to display identification information of an apparatus having the saturation indication detected; an apparatus name column 2303 to display type identification information of the apparatus; a belonging location column 2304 to display identification information of hardware to which the apparatus belongs; a duty factor column 2305 to display the duty factor of the apparatus; a column 2306 of a name of the application using the apparatus, in which the identification information of the application having the dependency relation of the performance with respect to the apparatus is to be displayed; an application operating server column 2307 to display identification information of the host server in which the application operates; a response time column 2308 to display the response time of the application; a correlation coefficient column 2309 to display the correlation coefficient of the performance information between the apparatus and the application; a start date column 2310 to display start date information of a period and an end date column 2311 to display end date information, which indicate a period when correlation coefficient calculation has been performed; and a report column 2312 to display buttons for displaying a screen in which details of performance information used in the calculation of the correlation coefficient are displayed and buttons 2313. All of the columns 2302 to 2313 do not have to be necessarily displayed in the screen.

Figure 24:
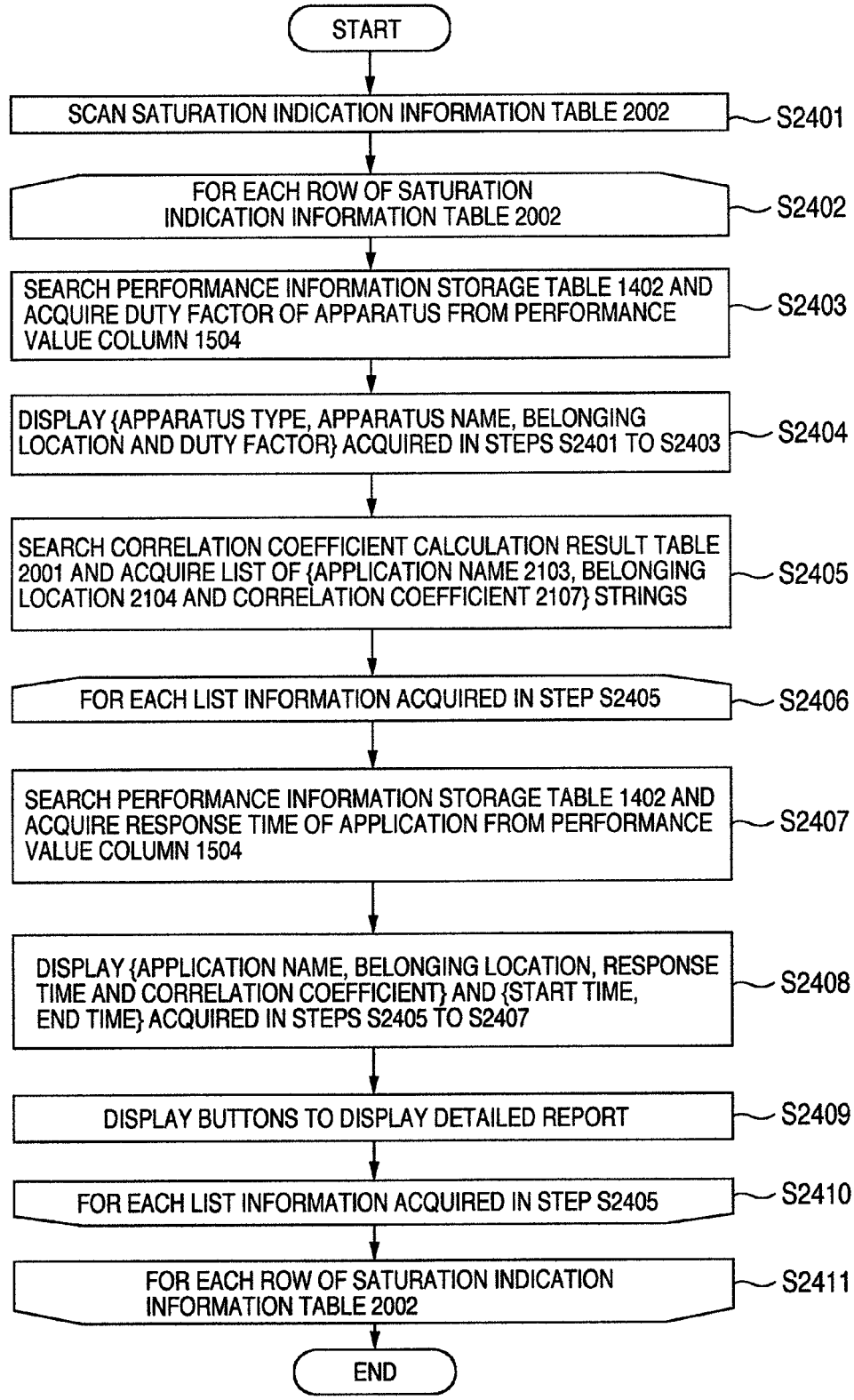
FIG. 24 is a flow chart showing the saturation indication information output processing of the apparatus performance management software according to Embodiment 1.

FIG. 24 is a flow chart showing the saturation indication information output processing of the apparatus performance management software according to Embodiment 1. Software processing of the apparatus performance management software 181 is realized by executing the processing by the CPU of the performance management server 151 (see FIG. 1). The saturation indication information output processing S238 of the apparatus performance management software 181 scans the saturation indication information table 2002 (see FIG. 22) in step S2401, and subjects each row of the saturation indication information table 2002 to loop processing in steps S2402 to S2411.

In the loop processing, first in the step S2403, the performance information storage table 1402 (see FIG. 15) is searched by use of values of {the apparatus type column 2200, the apparatus name column 2201, the belonging location column 2202, the start time column 2203 and the end time column 2204} searched from the saturation indication information table 2002 as keys, and the duty factor is acquired from the performance value column 1504.

Subsequently, in the step S2404, the values of {the apparatus type, the apparatus name, the belonging location and the duty factor} acquired in the steps S2401 to S2403 are displayed as values of the columns 2302 to 2305 of FIG. 23. In a case where the duty factors of a plurality of times are acquired in the period represented by the start time and the end time and the duty factors of all the times of the period cannot be displayed for the sake of convenience of a screen display region, the acquired duty factors may be rounded into one value or a plurality of values and displayed. At this time, an average value of the period, the last value of the period or the maximum value of the period may be displayed. In the present embodiment, contents to be displayed are not limited.

Subsequently, in the step S2405, the correlation coefficient calculation result table 2001 (see FIG. 21) is searched by use of the values of {the apparatus type column 2200, the apparatus name column 2201, the belonging location column 2202, the start time column 2203 and the end time column 2204} as keys, and a list of values of {the application name column 2103, the belonging location column 2104 and the correlation coefficient column 2107} is acquired.

Subsequently, in the steps S2406 to S2410, each of the acquired list information on the application is subjected to the loop processing. In the step S2407 of the loop, the performance information storage table 1402 (see FIG. 15) is searched by use of the values of {the application name column 2103, the belonging location column 2104, the start time column 2203 and the end time column 2204} as the keys, and the response time of the application is acquired from the performance value column 1504.

Subsequently, in the step S2408, the values of {the application name, the belonging location, the response time and the correlation coefficient} acquired in the steps S2405 to S2407 and the values of the {the start time and the end time} determined in the step S2401 are displayed as the values of the columns 2306 to 2311 of FIG. 23. As to the response time, in the same manner as in the duty factor of the apparatus, when the duty factors of all the times of the period cannot be displayed for the sake of convenience of the screen display region, the acquired duty factors may be rounded into one value or a plurality of values and displayed. In the step S2409, the button to display the detailed information of the performance information used in the correlation coefficient calculation for each combination of the apparatus and the application is displayed as the button 2313 as an element of the report column 2312.

Figure 25:
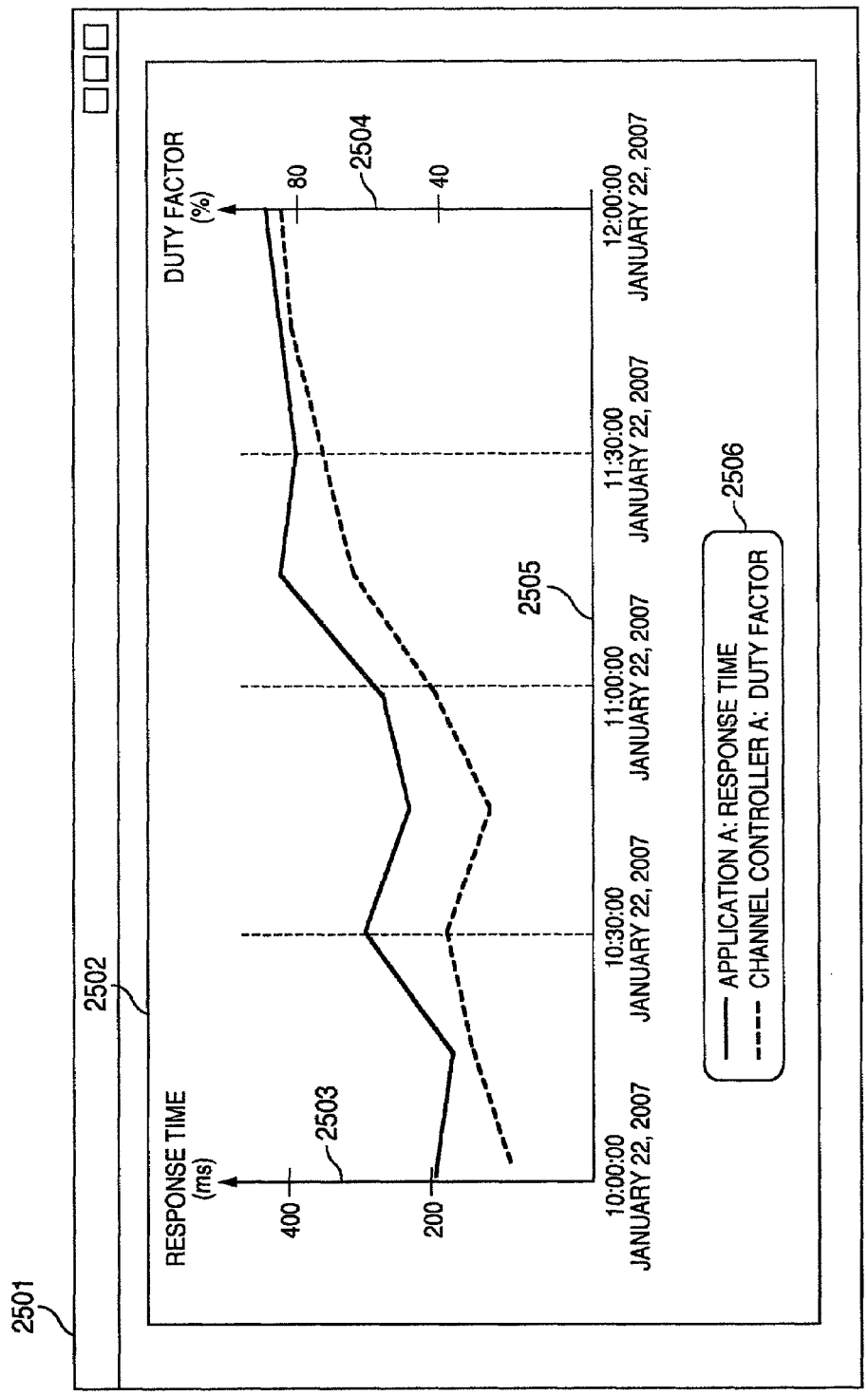
FIG. 25 is an explanatory view showing a screen example for output of detailed information of a performance value for use in calculating the correlation coefficient by the saturation indication information output processing of the apparatus performance management software according to Embodiment 1.

FIG. 25 is an explanatory view showing a screen example for output of detailed information of a performance value used in calculating the correlation coefficient by the saturation indication information output processing of the apparatus performance management software according to Embodiment 1. A screen 2501 to output the detailed information of the performance value used in calculating the correlation coefficient by the saturation indication information output processing S238 of the apparatus performance management software 181 includes one graph 2502. An abscissa 2505 of the graph indicates a time axis. One ordinate 2503 indicates the response time of the application, and another ordinate 2504 indicates the duty factor of the apparatus. The graph 2502 may have a legend 2506. In the legend, the identification information of the application and the apparatus is displayed. If necessary, the type of the performance information may be displayed. Contents of the graph may be displayed in a table form. The graph 2502 of FIG. 25 may be displayed in the screen 2301 of FIG. 23.

Furthermore, the saturation indication information output processing S238 may give alert by all or one of methods such as output with the screen and/or the log, E-Mail, a simple network management protocol (SNMP) and execution of a command with respect to one of possible combinations of the identification information of the apparatus detected as the apparatus having a high possibility that the performance problem will be caused in the application in future or the apparatus having a high possibility that the performance problem is caused in the application at present, the identification information of a logical existence obtained by abstracting the apparatus having the dependency relation of the performance with respect to the apparatus, the identification information of the application having the dependency relation of the performance with respect to the logical existence and the performance information of the apparatus, the logical existence or the application.

In the present embodiment, the performance management server 151 which manages the apparatus performance in the system including one or more apparatuses and one or more applications having the dependency relation of the performance with respect to the apparatus executes, by the apparatus performance management software 181, the constitutional information collection processing S233 to collect the constitutional information of the apparatus and the application and the constitutional information of the dependency relation of the performance established between the apparatus and the application, the performance information collection processing S231 to collect the performance information of the apparatus and the application, the saturation indication detection processing S236 to analyze the correlation between the change values with time of the performance information of the apparatus and the application for the predetermined period and to detect that the apparatus gives the saturation indication, when the correlation coefficient obtained by the correlation analysis is the predetermined threshold value or more, and the saturation indication information output processing S238 to notify the management client who manages the performance of the saturation indication association information of the apparatus supposed to give the saturation indication, when it is detected that the apparatus gives the saturation indication. In consequence, it is possible to detect the apparatus having a high possibility that the performance problem will be caused in the application in future or the apparatus having a high possibility that the performance problem is caused in the application at present.

Embodiment 2

In Embodiment 1, a performance saturation indication of an apparatus is detected by correlation analysis of a response time of an application and a duty factor of the apparatus. In Embodiment 2, in a case such as a case where the response time of the application cannot be acquired for some reason, the performance saturation indication of the apparatus is detected by use of the response time acquired in a logical unit made in the apparatus instead of the response time of the application. The embodiment will be described with reference to FIGS. 26 to 32.

Figure 26:
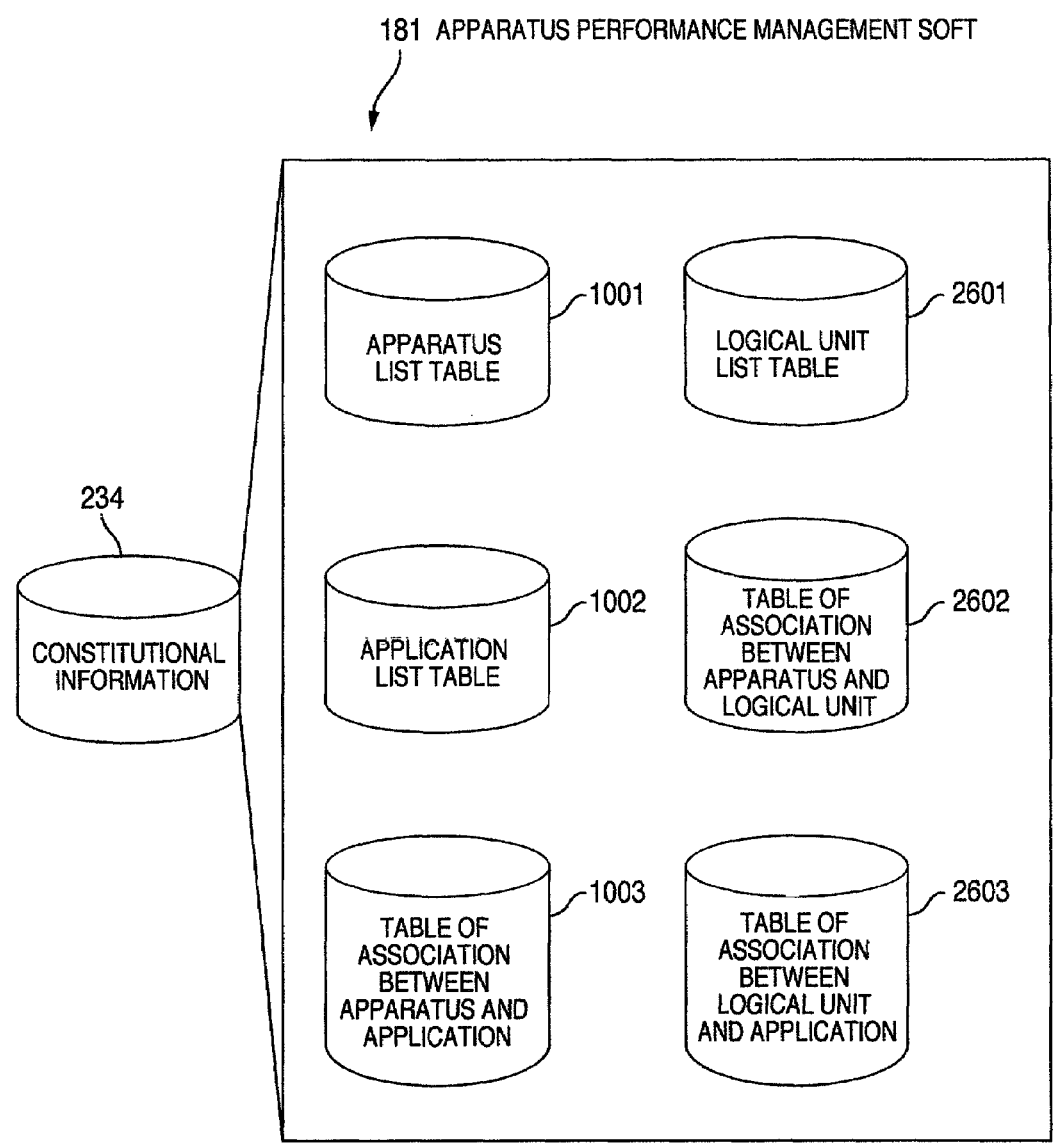
FIG. 26 is a constitution diagram showing a table included in constitutional information of apparatus performance management software according to Embodiment 2.

FIG. 26 is a constitution diagram showing a table included in constitutional information of apparatus performance management software according to Embodiment 2. FIG. 26 shows an example of the table included in constitutional information 234 in a case where a correlation between performance information of the apparatus and performance information of the logical unit as a substitute for the application is analyzed in order to detect the saturation indication. The constitutional information 234 of apparatus performance management software 181 has, in addition to the table shown in FIG. 10, a logical unit list table 2601 to store list information of the logical unit, a table 2602 of association between the apparatus and the logical unit to store dependency relation information of a performance established between the apparatus and the logical unit, and a table 2603 of association between the logical unit and the application to similarly store a dependency relation of the performance established between the logical unit and the application.

Figure 27:
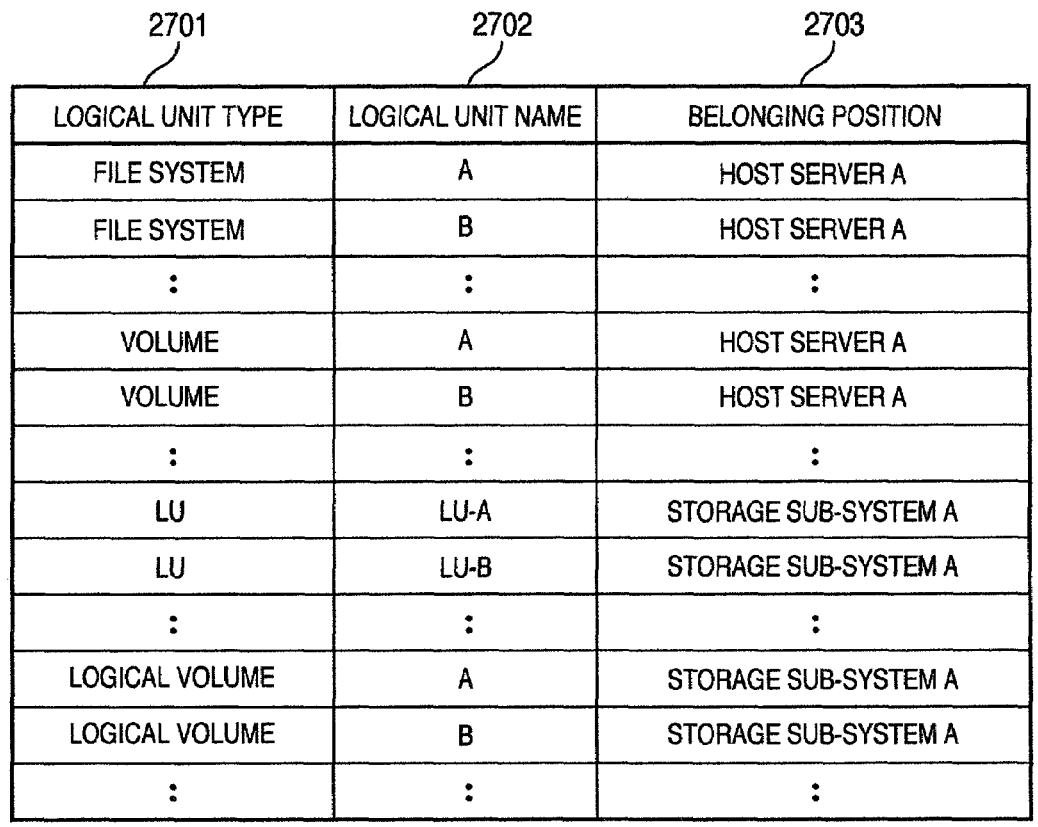
FIG. 27 is an explanatory view showing a structure of a logical unit list table.

FIG. 27 is an explanatory view showing a structure of a logical unit list table. The table shown in FIG. 27 shows one example of a structure of the logical unit list table 2601 (see FIG. 26). The logical unit list table 2601 is a table constituted by extracting the list information on the logical unit from an apparatus monitoring agent and integrating the information. The table includes a logical unit type column 2701 to store identification information of a type of the logical unit, a logical unit name column 2702 to store identification information of a logical unit name, and a belonging location column 2703 to store identification information of hardware which holds the logical unit.

FIG. 28 is an explanatory view showing a structure of a table of association between the apparatus and the logical unit. The table shown in FIG. 28 shows one example of the structure of the table 2602 of the association between the apparatus and the logical unit (see FIG. 26). The table 2602 of the association between the apparatus and the logical unit is a table constituted by joining association information among the apparatus, the logical unit and the application collected by the monitoring agent and integrating the dependency relation of the performance between the apparatus and the logical unit. The table includes an apparatus type column 2800 to store identification information of an apparatus type, an apparatus name column 2801 to store identification information of an apparatus name of the apparatus type, a belonging location column 2802 to store identification information of hardware to which the apparatus belongs, a logical unit type column 2803 to store identification information of a logical unit type having the dependency relation of the performance with respect to the apparatus, a logical unit name column 2804 to store identification information of a logical unit name of the logical unit type and a belonging location column 2805 to store identification information of the hardware to which the logical unit belongs.

Specifically, in the example of the dependency relation of the performance shown in FIG. 3, the relation between each apparatus and the logical unit is calculated from information collected by the monitoring agent, and stored in the table 2602 of the association between the apparatus and the logical unit. For example, it is seen that a port A (318) belongs to a host server A (301), a volume A (314) belongs to the host server A (301) and the port A (318) and the volume A (314) have the dependency relation of the performance.

FIG. 13 shows a method for solving the application using an RAID group from the RAID group which is a terminal of the apparatus. When the method is used, the dependency relation of the performance established between the apparatus and the logical unit using the apparatus can similarly be calculated.

Examples of the dependency relation of the performance between the logical unit and the apparatus as a calculation result include {the LU and a storage port, the LU and a channel controller, the LU and a cache, the LU and a disk controller, the LU and the RAID group, a logical volume and the storage port, the logical volume and the channel controller, the logical volume and the cache, the logical volume and the disk controller, the logical volume and the RAID group, a volume and a host port, the volume and a an SAN switch port, the volume and a CPU, the volume and a memory, the volume and the storage port, the volume and the channel controller, the volume and the cache, the volume and the disk controller, the volume and the RAID group, a file system and the CPU, the file system and the memory, the file system and the host port, the file system and the SAN switch port, the file system and the storage port, the file system and the channel controller, the file system and the cache, the file system and the disk controller, and the file system and the RAID group}.

FIG. 29 is an explanatory view showing a structure of the table of the association between the logical unit and the application. The table shown in FIG. 29 shows one example of a structure of the table 2603 of the association between the logical unit and the application (see FIG. 26). The table 2603 of the association between the logical unit and the application is a table constituted by combining the association information among the apparatus, the logical unit and the application collected by the monitoring agent and integrating the dependency relation of the performance established between the logical unit and the application. The table includes a logical unit type column 2900 to store identification information of a logical unit type, a logical unit name column 2901 to store identification information of a logical unit name, a belonging location column 2902 to store identification information of hardware to which the logical unit belongs, an application name column 2903 to store identification information of an application name having the dependency relation of the performance with respect to the logical unit, and a belonging location column 2904 to store identification information of a server at which the application operates.

Specifically, in the example of the dependency relation of the performance shown in FIG. 3, the relation between each logical unit and the application is calculated from the information collected by the monitoring agent, and stored in the table 2603 of the association between the logical unit and the application. It is to be noted that FIG. 13 shows the method for solving the application using the RAID group from the RAID group which is the terminal of the apparatus. When the method is used, the dependency relation of the performance established between the logical unit and the application can similarly be calculated.

FIG. 30 is a flow chart showing saturation indication detection processing of the apparatus performance management software according to Embodiment 2. The flow chart of saturation indication detection processing S236A of the apparatus performance management software 181 is processing modified so as to analyze a correlation between a duty factor of the apparatus and a response time measured for each logical unit having the dependency relation of the performance with respect to the apparatus. The flow chart will be described.

First, in step S3001, a period to analyze a correlation of a change of the performance information between the apparatus and the logical unit is determined, The period may be a range from the current time to a time traced from the current time as much as a specific time or a time range determined by a manager with a screen, a setting file or the like.

Next, in step S3002, a list of the apparatuses to be set as saturation indication detecting targets is acquired from an apparatus list table 1001 (see FIG. 11). A column to set whether or not each apparatus is to be set as the saturation indication detecting target as in a saturation indication detecting target column 1104 of the apparatus list table 1001 corresponds to processing of extracting the apparatus designated as the saturation indication detecting target, if any.

Subsequently, in steps S3003 to S3012, each of the apparatuses acquired in the step S3002 is subjected to loop processing.

In the step S3004, a list of the logical units having the dependency relation of the performance with respect to the apparatus is limited and acquired using the table 2602 of the association between the apparatus and the logical unit (see FIG. 28). In the step S3005, the performance information of the apparatus in the period determined in the step S3001 is acquired from a performance information storage table 1402 (see FIG. 15). Subsequently, in the steps S3006 to S3009, each of the logical units acquired in the step S3005 is subjected to the loop processing.

In the step S3007, the performance information of the logical unit in the period determined in the step S3001 is acquired from the performance information storage table 1402. In the step S3008, a correlation coefficient R is measured between the performance information of the apparatus acquired in the step S3005 and the performance information of the logical unit acquired in the step S3007, and a set of {the identification information of the apparatus, the identification information of the logical unit, the period information determined in the step S3001 and the correlation coefficient R} is stored in a correlation coefficient calculation result table 2001 (see FIG. 21) of the saturation indication information 237 of the apparatus performance management software 181. Here, the application name column 2103 of the apparatus list table 2001 may be regarded as a column to store the identification information of the logical unit. Similarly, the column to store the identification information of the host server at which the application operates may be regarded as a column to store identification information of hardware to which the logical unit belongs. The step S3009 is an end of a loop concerning the logical unit.

In the step S3010, it is judged whether or not the apparatus has given a saturation indication by use of the correlation coefficient R of the performance information between the apparatus and the logical unit, stored in the step S3008, as an index indicating a degree of saturation of the apparatus. In a case where it is judged (detected) that the apparatus has given the saturation indication (step S3010, Yes), the processing advances to the step S3011. In a case where it is not judged (detected) that the apparatus has given the saturation indication (step S3010, No), the processing advances to the step S3012.

The step S3011 stores a set of {the identification information of the apparatus judged to have given the saturation indication and the period information determined in the step S3001} in the saturation indication information table 2002 (see FIG. 22) of the saturation indication information 237 of the apparatus performance management software 181. The step S3012 is an end of a loop concerning the apparatus.

Even in the flow chart shown in FIG. 30, the duty factor of the apparatus is used as the performance information of the apparatus in the same manner as in the flow chart described with reference to FIG. 17. As a performance value of the logical unit, a response time as a service level received from the apparatus by the logical unit is used. A method for calculating the correlation coefficient between the duty factor of the apparatus and the response time of the logical unit is similar to that of FIG. 17. In a case where one logical unit or a plurality of logical unit use the apparatus, variations of a method for determining whether or not the apparatus is saturated are similar to contents described with reference to FIG. 17.

FIG. 31 is an explanatory view showing a structure of a correlation coefficient calculation result table according to Embodiment 2. A correlation coefficient calculation result table 2001A shown in FIG. 31 is an example in which a correlation coefficient calculation result table 2001 (see FIG. 21) included in the saturation indication information 237 of the apparatus performance management software 181 is modified so as to use the logical unit as a substitute for the application. The correlation coefficient calculation result table 2001A includes an apparatus type column 3100 to store identification information of an apparatus type, an apparatus name column 3101 to store identification information of an apparatus name, a belonging location column 3102 to store identification information of hardware to which the apparatus belongs, a logical unit type column 3101 to store identification information of a logical unit type having the dependency relation of the performance with respect to the apparatus, a logical unit name column 3104 to store identification information of a logical unit name, and a belonging location column 3105 to store identification information of the hardware to which the logical unit belongs. The table further includes a start time column 3106 to store a start time and an end time column 3107 to store an end time so that period information is stored, and a correlation coefficient column 3108 to store the correlation coefficient. In the step S3008 of the flow chart of FIG. 30, the calculated correlation coefficient may be stored in the correlation coefficient calculation result table 2001A having the structure shown in FIG. 31.

Specifically, it is seen that, in the example of the dependency relation of the performance shown in FIG. 3, the correlation coefficient between a channel controller A (339) and an LU-A (335) is calculated for a correlation coefficient calculation period of two hours from the start time 10:00:00 of Jan. 22, 2007 till the end time 12:00:00 of Jan. 22, 2007, and the correlation coefficient is 0.56.

FIG. 32 is an explanatory view showing a screen example output by saturation indication information output processing of the apparatus performance management software according to Embodiment 2. As compared with FIG. 23, FIG. 32 is an example in which the screen example output by the saturation indication information output processing S238 of the apparatus performance management software 181 is modified so as to detect the performance saturation indication of the apparatus by use of the logical unit as the substitute for the application. A screen 3201 of FIG. 32 includes one table. The table includes an apparatus type column 3202 to display identification information of an apparatus type having the saturation indication detected; an apparatus name column 3203 to display type identification information of an apparatus name; an apparatus belonging location column 3204 to display identification information of hardware to which the apparatus belongs; a duty factor column 3205 to display the duty factor of the apparatus; a logical unit type column 3206 to display identification information of a logical unit type having the dependency relation of the performance with respect to the apparatus; a logical unit name column 3207 to display identification information of the logical unit name; a logical unit belonging location column 3208 to display identification information of the hardware to which the logical unit belongs; a response time column 3209 to display the response time of the logical unit; a correlation coefficient column 3210 to display the correlation coefficient of the performance information between the apparatus and the logical unit; a start date column 3211 to display start date information of a period and an end date column 3212 to display end date information, which indicate a period when the correlation coefficient has been calculated; an associated application name column 3213 to display identification information of a name of the application using the logical unit; an application operating serer column 3214 to display identification information of the host server at which the application operates; and a report column 3215 to display buttons for displaying a screen in which details of performance information used in the calculation of the correlation coefficient are displayed and buttons 3216. All of the columns 3202 to 3215 do not have to be necessarily displayed in the screen.

Figure 33:
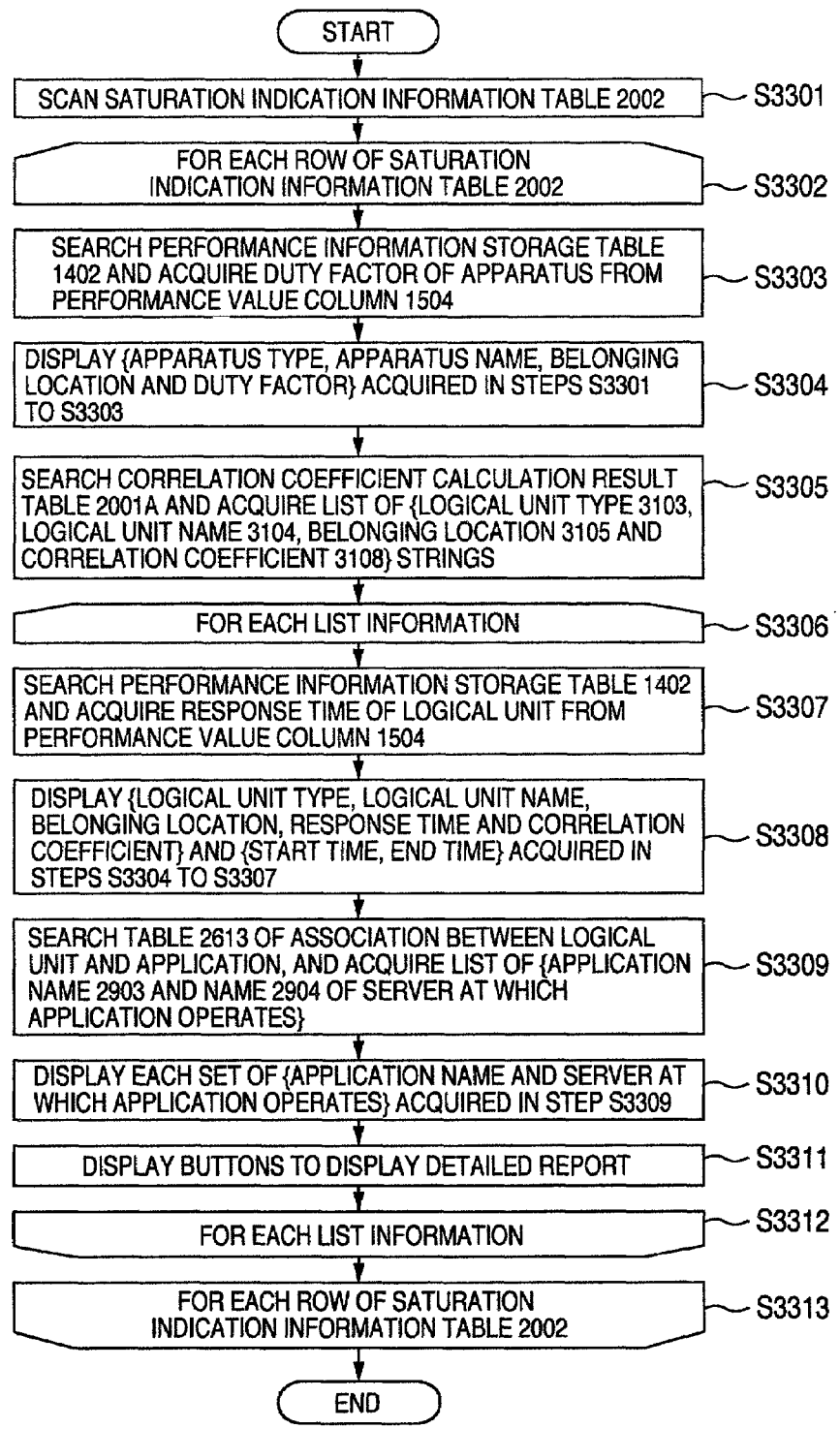
FIG. 33 is a flow chart showing the saturation indication information output processing of the apparatus performance management software according to Embodiment 2.

FIG. 33 is a flow chart showing the saturation indication information output processing of the apparatus performance management software according to Embodiment 2. In FIG. 33, as compared with FIG. 24, saturation indication information output processing S238A is an example in which a flow chart example of the saturation indication information output processing S238 of the apparatus performance management software 181 is modified so as to use the logical unit as the substitute for the application. The saturation indication information output processing S238A scans the saturation indication information table 2002 in step S3301, and subjects each row of the saturation indication information table 2002 to loop processing in steps S3302 to S3313.

In the loop processing, first in the step S3303, a performance information storage table 1402 (see FIG. 15) is searched by use of values of {an apparatus type column 2200, an apparatus name column 2201, a belonging location column 2202, a start time column 2203 and an end time column 2204} searched from the saturation indication information table 2002 (see FIG. 22) as keys, and the duty factor of the apparatus is acquired from the performance value column 1504. Subsequently, in the step S3304, the values of {the apparatus type, the apparatus name, the belonging location and the duty factor} acquired in the steps S3301 to S3303 are displayed as values of the columns 3202 to 3205 of FIG. 32. In a case where the duty factors of a plurality of times are acquired in the period represented by the start time and the end time and the duty factors of all the times of the period cannot be displayed for the sake of convenience of a screen display region, the acquired duty factors may be rounded into one value or a plurality of values and displayed. At this time, an average value of the period, the last value of the period or the maximum value of the period may be displayed. In the present embodiment, contents to be displayed are not limited.

Subsequently, in the step S3305, the correlation coefficient calculation result table 2001A structured as shown in FIG. 31 is searched by use of the values of {the apparatus type column 2200, the apparatus name column 2201, the belonging location column 2202, the start time column 2203 and the end time column 2204} as keys, and a list of values of {the logical unit type column 3103, the logical unit name column 3104, the belonging location column 3105 and the correlation coefficient column 3108} is acquired. Subsequently, in the steps S3306 to S3312, each of the acquired list information on the logical unit is subjected to the loop processing.

In the step S3307, the performance information storage table 1402 is searched by use of the values of {the logical unit type column 3103, the logical unit name column 3104, the belonging location column 3105, the start time column 2203 and the end time column 2204} as the keys, and the response time of the logical unit is acquired from the performance value column 1504. Subsequently, in the step S3308, the values of {the logical unit type, the logical unit name, the belonging location, the response time and the correlation coefficient} acquired in the steps S3304 to S3307 and the values of the {the start time and the end time} determined in the step S3301 are displayed as the values of the columns 3206 to 3212 of FIG. 32. As to the response time, in the same manner as in the duty factor of the apparatus, when the duty factors of all the times of the period cannot be displayed for the sake of convenience of the screen display region, the acquired duty factors may be rounded into one value or a plurality of values and displayed.

Subsequently, in the step S3309, the table 2603 of the association between the logical unit and the application is searched by use of values of {the logical unit type, the logical unit name and the belonging location} strings as keys, and a list of {the application name column 2903 and the belonging location column 2904 of the server at which the application operates} is acquired. Subsequently, in the step S3310, sets of {the application name column 2903 and the belonging location column 2904 of the server at which the application operates} acquired in the step S3309 are displayed as values of the columns 3213 and 3214 of FIG. 32. In the step S3311, the button to display the detailed information of the performance information used in the correlation coefficient calculation for each combination of the apparatus and the logical unit is displayed as the element 3216 of the column 3215 of FIG. 32.

Figure 34:
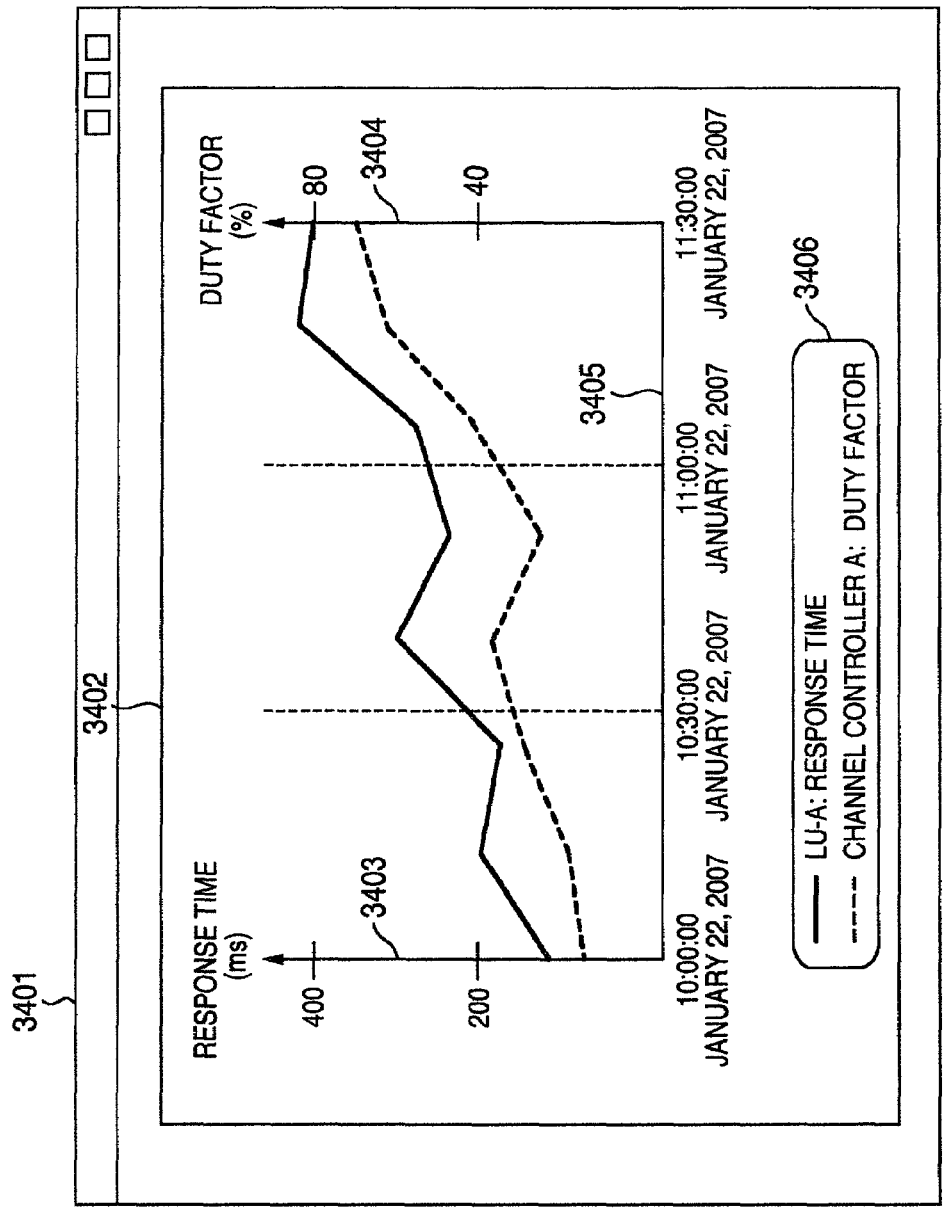
FIG. 34 is an explanatory view showing a screen example in which the saturation indication information output processing of the apparatus performance management software according to Embodiment 2 outputs detailed information of a performance value used in calculating a correlation coefficient.

FIG. 34 is an explanatory view showing a screen example in which the saturation indication information output processing of the apparatus performance management software according to Embodiment 2 outputs detailed information of a performance value used in calculating a correlation coefficient. In FIG. 34, as compared with FIG. 25, a screen example in which the saturation indication information output processing S238 of the apparatus performance management software 181 outputs the detailed information of the performance value used in calculating the correlation coefficient is modified so as to use the logical unit as the substitute for the application. A screen 3401 of FIG. 34 includes one graph 3402. An abscissa 3405 of the graph indicates a time axis. One ordinate 3403 indicates the response time of the logical unit, and another ordinate 3404 indicates the duty factor of the apparatus. The graph 3402 may have a legend 3406. In the legend, the identification information of the logical unit and the apparatus is displayed. If necessary, the type of the performance information may be displayed. Contents of the graph may be displayed in a table form. The graph 3402 of FIG. 32 may be displayed in the screen 3201 of FIG. 32.

In the method for managing the apparatus performance according to the present embodiment, the performance management server 151 which manages the apparatus performance in the system including one or more apparatuses and one or more applications having the dependency relation of the performance with respect to the apparatus executes the constitutional information collection processing S233 to collect the constitutional information of the apparatus, the logical unit as the logical existence obtained by abstracting the apparatus and the application and the constitutional information of the dependency relation of the performance established among the apparatus, the logical unit and the application, the performance information collection processing S231 to collect the performance information of the apparatus, the logical unit and the application, the performance saturation indication detection processing S236 to detect the saturation indication of the apparatus based on the constitutional information and the performance information, and the saturation indication information output processing S238 to notify the management client who manages the performance of the saturation indication association information of the apparatus supposed to give the saturation indication, when it is detected that the apparatus gives the saturation indication. In consequence, it is possible to detect the apparatus having a high possibility that the performance problem will be caused in the application in future or the apparatus having a high possibility that the performance problem is caused in the application at present.

It is preferable that the saturation indication detection processing S236 analyzes the correlation between the change value with time of the performance information of the apparatus and the change value with time of the performance information of the logical unit having the dependency relation of the performance with respect to the apparatus for a predetermined period and that it is detected that the apparatus gives the saturation indication, when the correlation coefficient obtained by the correlation analysis is the predetermined threshold value or more.

Moreover, the saturation indication detection processing S236 may analyze the correlation between the change value with time of the performance information of the apparatus and the change value with time of the performance information of the application for a predetermined period and that it may be detected that the apparatus gives the saturation indication, when the correlation coefficient obtained by the correlation analysis is the predetermined threshold value or more.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for managing apparatus performance which manages the apparatus performance in a system including one or more apparatuses and one or more applications having a dependency relation of performance with respect to the apparatus,
  wherein a management server which manages the apparatus comprises and iteratively executes:
  constitutional information collection processing of collecting constitutional information of the apparatus, constitutional information of the application and constitutional information of the dependency relation of the performance established between the apparatus and the application;
  performance information collection processing comprising (a) collecting performance information of the apparatus in a first loop processing, and (b) collecting performance information of the application in a second loop processing; and
  saturation indication detection processing comprising: (1) analyzing for a predetermined period a correlation between (i) a change value with time of the performance information of the apparatus and (ii) a change value with time of the performance information of the application having the dependency relation of the performance with respect to the apparatus, (2) determining an index indicating a degree of saturation of the apparatus, and (3) detecting a saturation indication of the apparatus based on the index.

2. The method for managing the apparatus performance according to claim 1, wherein the index is a correlation coefficient obtained by the correlation analysis, and the saturation indication detection processing detects that the apparatus is saturated in performance, when the correlation coefficient is a predetermined threshold value or more.

3. The method for managing the apparatus performance according to claim 1, wherein, in a case where one apparatus is used by a plurality of applications, the saturation indication detection processing obtains, based on a weight of each of the applications, a weighted average of a plurality of correlation coefficients obtained by analyzing a correlation between a change value with time of the performance information of the apparatus and a change value with time of the performance information of the application for each application for a predetermined period.

4. The method for managing the apparatus performance according to claim 1, wherein the management server further comprises and executes:
  processing target apparatus determination processing of searching the constitutional information with the selected application, and determining the apparatus having the dependency relation of the performance with respect to the selected one or more applications as the apparatus which is a processing target of the saturation indication detection processing, the apparatus comprises at least one of Server Port, SAN Switch Port, Storage Port, Channel Controller, Disk Controller, and Raid Group.

5. The method for managing the apparatus performance according to claim 1, wherein the management server further comprises and iteratively executes:
  saturation indication information output processing of notifying a management client who manages the performance of saturation indication information associated with the saturation indication of the apparatus judged to have the saturation indication, when it is detected by the saturation indication detection processing that the apparatus has the saturation indication.

6. The method for managing the apparatus performance according to claim 5, wherein a method of the notification is a method by output with at least one of a screen and a log or a method of warning with at least one of an electronic mail, a simple network management protocol (SNMP) and execution of a command.

7. A method for managing apparatus performance which manages the apparatus performance in a system including one or more apparatuses and one or more applications having a dependency relation of performance with respect to the apparatus,
  wherein a management server which manages the apparatus comprises and iteratively executes:
  constitutional information collection processing of collecting constitutional information of the apparatus, constitutional information of a logical unit which is a logical existence obtained by abstracting the apparatus, constitutional information of the application and constitutional information of the dependency relation of the performance established among the apparatus, the logical unit and the application;
  performance information collection processing comprising (a) collecting performance information of the apparatus in a first loop processing, (b) collecting performance information of the logical unit in a second loop processing, and (c) collecting performance information of the application in a third loop processing; and saturation indication detection processing comprising: (1) analyzing for a predetermined period a correlation between (i) a change value with time of the performance information of the apparatus and (ii) a change value with time of the performance information of the logical unit having the dependency relation of the performance with respect to the apparatus, (2) determining an index indicating a degree of saturation of the apparatus, and (3) detecting a saturation indication of the apparatus based on the index.

8. The method for managing the apparatus performance according to claim 7, wherein the index is a correlation coefficient obtained by the correlation analysis, and detects that the apparatus is saturated in performance, when the correlation coefficient is a predetermined threshold value or more.

9. The method for managing the apparatus performance according to claim 7, wherein the logical unit comprises at least one of a file system of a server, a logical unit of a storage system and a logical volume of the storage system.

10. A system for managing apparatus performance which manages the apparatus performance in a system including one or more apparatuses and one or more applications having a dependency relation of performance with respect to the apparatus, comprising:

constitutional information collection means for collecting constitutional information of the apparatus, constitutional information of the application and constitutional information of the dependency relation of the performance established between the apparatus and the application;

performance information collection means for (a) collecting performance information of the apparatus in a first loop processing, and (b) collecting performance information of the application in a second loop processing; and performance saturation indication detection means for (1) iteratively analyzing for a predetermined period a correlation between (i) a change value with time of the performance information of the apparatus and (ii) a change value with time of the performance information of the application having the dependency relation of the performance with respect to the apparatus, (2) determining an index indicating a degree of saturation of the apparatus, and (3) detecting a saturation indication of the apparatus based on the index.

11. The system for managing the apparatus performance according to claim 10, wherein the index is a correlation coefficient obtained by the correlation analysis, and the performance saturation indication detection means detects that the apparatus is saturated in performance, when the correlation coefficient is a predetermined threshold value or more.

12. The system for managing the apparatus performance according to claim 10, wherein, in a case where one apparatus is used by a plurality of applications, the performance saturation indication detection means obtains, based on a weight of each of the applications, a weighted average of a plurality of correlation coefficients obtained by analyzing a correlation between a change value with time of the performance information of the apparatus and a change value with time of the performance information of the application for each application for a predetermined period.

13. The system for managing the apparatus performance according to claim 10, further comprising:

processing target apparatus determination means for searching the constitutional information with the selected application, and determining the apparatus having the dependency relation of the performance with respect to the selected one or more applications as the apparatus which is a processing target of the saturation indication detection means, the apparatus comprises at least one of Server Port, SAN Switch Port, Storage Port, Channel Controller, Disk Controller, and Raid Group.

14. The system for managing the apparatus performance according to claim 10, further comprising:

saturation indication information output means for iteratively notifying a management client who manages the performance of saturation indication information associated with the saturation indication of the apparatus judged to have the saturation indication, when it is detected by the performance saturation indication detection means that the apparatus has the saturation indication.

15. The system for managing the apparatus performance according to claim 14, wherein the saturation indication information output means gives a warning with output of at least one of a screen and a log or at least one of an electronic mail, a simple network management protocol (SNMP) and execution of a command.

16. A system for managing apparatus performance which manages the apparatus performance in a system including one or more apparatuses and one or more applications having a dependency relation of performance with respect to the apparatus, comprising:

constitutional information collection means for collecting constitutional information of the apparatus, constitutional information of a logical unit which is a logical existence obtained by abstracting the apparatus, constitutional information of the application and constitutional information of the dependency relation of the performance established among the apparatus, the logical unit and the application;

performance information collection means for (a) collecting performance information of the apparatus in a first loop processing, (b) collecting, performance information of the logical unit in a second loop processing, and (c) collecting performance information of the application in a third loop processing; and performance saturation indication detection means for (1) iteratively analyzing for a predetermined period a correlation between (i) a change values with time of the performance information of the apparatus and (ii) a change value with time of the performance information of the logical unit having the dependency relation of the performance with respect to the apparatus, (2) determining an index indicating a degree of saturation of the apparatus, and (3) detecting a saturation indication of the apparatus based on the index.

17. The system for managing the apparatus performance according to claim 16, the index is a correlation coefficient obtained by the correlation analysis, and the performance saturation indication detection means detects that the apparatus is saturated in performance, when the correlation coefficient is a predetermined threshold value or more.

18. The system for managing the apparatus performance according to claim 16, wherein the logical unit comprises at least one of a file system of a server, a logical unit of a storage system and a logical volume of the storage system.

19. A non-transitory storage medium storing a management program to manage apparatus performance in a system including one or more apparatuses and one or more applications having a dependency relation of performance with respect to the apparatus, the management program allowing a computer to iteratively execute:

constitutional information collection processing of collecting constitutional information of the apparatus, constitutional information of the application and constitutional information of the dependency relation of the performance established between the apparatus and the application;

performance information collection processing comprising (a) collecting performance information of the apparatus in a first loop processing, and (b) collecting performance information of the application in a second loop processing;

processing target apparatus determination processing of searching the constitutional information with the selected application, and determining the apparatus having the dependency relation of the performance with respect to the selected one or more applications as the apparatus which is a processing target; and saturation indication detection processing comprising: (1) analyzing a correlation between (i) a change value with time of the performance information of the apparatus as the processing target and (ii) a change value with time of the performance information of the application for a predetermined period, (2) determining a correlation coefficient indicating a degree of saturation of the apparatus, and (3) detecting that the apparatus has a saturation indication, when the correlation coefficient obtained by the correlation analysis is a predetermined threshold value or more.

20. A non-transitory storage medium storing a management program to manage apparatus performance in a system including one or more apparatuses and one or more applications having a dependency relation of performance with respect to the apparatus, the management program allowing a computer to iteratively execute:

constitutional information collection processing of collecting constitutional information of the apparatus, constitutional information of a logical unit which is a logical existence obtained by abstracting the apparatus, constitutional information of the application and constitutional information of the dependency relation of the performance established among the apparatus, the logical unit and the application;

performance information collection processing comprising (a) collecting performance information of the apparatus in a first loop processing, (b) collecting performance information of the logical unit in a second loop processing, and (c) collecting performance information of the application in a third loop processing;

processing target apparatus determination processing of searching the constitutional information with the selected application, and determining the apparatus having the dependency relation of the performance with respect to the selected one or more applications as the apparatus which is a processing target;

saturation indication detection processing comprising (1) analyzing a correlation between (i) a change value with time of the performance information of the apparatus as the processing target and (ii) a change value with time of the performance information of the logical unit having the dependency relation of the performance with respect to the apparatus for a predetermined period, (2) detecting an index indicating a degree of saturation of the apparatus, and (3) detecting that the apparatus has a saturation indication, when a correlation coefficient obtained by the correlation analysis is a predetermined threshold value or more; and saturation indication information output processing of notifying a management client who manages the performance of saturation indication information associated with the saturation indication of the apparatus judged to have the saturation indication.

\* \* \* \* \*